US012732423B2

(12) United States Patent
Bouttier

(10) Patent No.: US 12,732,423 B2
(45) Date of Patent: Sep. 8, 2026

(54) METHOD, DEVICE, AND SYSTEM FOR CONTROLLING STATE PARAMETER BY COMMUNICATING DEVICE

(71) Applicant: MITSUBISHI ELECTRIC CORPORATION, Tokyo (JP)

(72) Inventor: Arnaud Bouttier, Rennes Cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 410 days.

(21) Appl. No.: 18/287,201

(22) PCT Filed: Dec. 16, 2021

(86) PCT No.: PCT/JP2021/047755

§ 371 (c)(1),
(2) Date: Oct. 17, 2023

(87) PCT Pub. No.: WO2022/259581

PCT Pub. Date: Dec. 15, 2022

(65) Prior Publication Data

US 2024/0214267 A1 Jun. 27, 2024

(30) Foreign Application Priority Data

Jun. 11, 2021 (EP) .................................... 21305808

(51) Int. Cl.
*G06F 12/00* (2006.01)
*H04B 1/10* (2006.01)
*H04L 41/0816* (2022.01)

(52) U.S. Cl.
CPC ........... *H04L 41/0816* (2013.01); *H04B 1/10* (2013.01)

(58) Field of Classification Search
CPC ...... H04L 41/0816; H04B 1/10; G05B 13/048
See application file for complete search history.

(56) References Cited

U.S. PATENT DOCUMENTS

2022/0261626 A1* 8/2022 Liu .......................... G06N 3/09

OTHER PUBLICATIONS

Tamjidi et al., Unifying Consensus and Covariance Intersection for Efficient Distributed State Estimation Over Unreliable Networks, Apr. 12, 2021, IEEE Transactions On Robotics, vol. 37, No. 5, pp. 1525-1538 (Year: 2021) (Year: 2021).*

(Continued)

*Primary Examiner* — Shawn X Gu
(74) *Attorney, Agent, or Firm* — Birch, Stewart, Kolasch & Birch, LLP

(57) ABSTRACT

A method for controlling a state parameter by a communicating device, referred to as processing device, in a set of communicating devices, a subset of communicating devices being associated to said processing device, said subset including the processing device and the communicating devices from which the processing device receives data for updating a local value of the state parameter, the processing device estimating an aggregated state parameter aggregating the local values of the state parameter of the communicating devices of the subset by using a Kalman filter which applies a process model, an error introduced by the process model, the processing device updating its local value of the state parameter based on the estimated aggregated state parameter; wherein the processing device determines a convergence level of the local values of the state parameter and modifies a covariance matrix of the process noise based on the determined convergence level.

14 Claims, 8 Drawing Sheets

(56) References Cited

OTHER PUBLICATIONS

Huamann et al., "Kalman Filtering in Mobile Consensus Networks", Research Gate, Oct. 2012, total 8 pages.

International Search Report (PCT/ISA/210) issued in PCT/JP2021/047755, dated Apr. 4, 2022.

Petitti et al., "Distributed Target Tracking for Sensor Networks with Only Local Communication", IEEE, 19th Mediterranean Conference on Control and Automation, Corfu, Greece, Jun. 20-23, 2011, pp. 662-667.

Ren et al., "Multi-agent Kalman Consensus with Relative Uncertainty", AACC, 2005 American Control Conference, Portalnd, OR, USA, Jun. 8-10, 2005, pp. 1865-1870.

Tamjidi et al., "Unifying Consensus and Covariance Intersection for Efficient Distributed State Estimation Over Unreliable Networks", IEEE Transactions on Robotics, vol. 37, No. 5, Oct. 2021, pp. 1525-1538.

Written Opion of the International Searching Authority (PCT/ISA/237) issued in PCT/JP2021/047755, dated Apr. 4, 2022.

European Communication pursuant to Article 94(3) EPC for European Application No. 21 305 808.4, dated Oct. 20, 2025.

Hardy, "Kalman Filter," Wikipedia, Aug. 26, 2018, XP055607108, pp. 1-31.

Chinese Office Action and Search Report for Chinese Application No. 202180099093.6, dated Mar. 20, 2026, with English translation of the Office Action.

Feng et al., "Adaptive unscented Kalman filter distributed fusion for rigid body pose estimation under occlusion," Control Theory & Applications, vol. 37, No. 1, Jan. 2020, pp. 69-80, with English abstract.

* cited by examiner

Iter. $k-1$

$m_{k-2|k-2}$ $P_{k-2|k-2}$ $v_{k-2}$ $y_{k-1}$ $$m_{k-1|k-2} = F_{k-2} m_{k-2|k-2} + B_{k-2} v_{k-2}$$
$$P_{k-1|k-2} = F_{k-2} P_{k-2|k-2} F_{k-2}^t + Q_{k-2}$$
$$K_{k-1} = P_{k-1|k-2} H_{k-1}^t \left(H_{k-1} P_{k-1|k-2} H_{k-1}^t + R_{k-1}\right)^{-1}$$
$$m_{k-1|k-1} = m_{k-1|k-2} + K_{k-1}\left(y_{k-1} - H_{k-1} m_{k-1|k-2}\right)$$
$$P_{k-1|k-1} = (I - K_{k-1} H_{k-1}) P_{k-1|k-2}$$

Iter. $k$

$m_{k-1|k-1}$ $P_{k-1|k-1}$ $v_{k-1}$ $y_k$ $$m_{k|k-1} = F_{k-1} m_{k-1|k-1} + B_{k-1} v_{k-1}$$
$$P_{k|k-1} = F_{k-1} P_{k-1|k-1} F_{k-1}^t + Q_{k-1}$$
$$K_k = P_{k|k-1} H_k^t \left(H_k P_{k|k-1} H_k^t + R_k\right)^{-1}$$
$$m_{k|k} = m_{k|k-1} + K_k\left(y_k - H_k m_{k|k-1}\right)$$
$$P_{k|k} = (I - K_k H_k) P_{k|k-1}$$

Iter. $k+1$

$m_{k|k}$ $P_{k|k}$ $v_k$ $y_{k+1}$ $$m_{k+1|k} = F_k m_{k|k} + B_k v_k$$
$$P_{k+1|k} = F_k P_{k|k} F_k^t + Q_k$$
$$K_{k+1} = P_{k+1|k} H_{k+1}^t \left(H_{k+1} P_{k+1|k} H_{k+1}^t + R_{k+1}\right)^{-1}$$
$$m_{k+1|k+1} = m_{k+1|k} + K_{k+1}\left(y_{k+1} - H_{k+1} m_{k+1|k}\right)$$
$$P_{k+1|k+1} = (I - K_{k+1} H_{k+1}) P_{k+1|k}$$

$$m_{k-1|k-2} = F_{k-2} m_{k-2|k-2} + B_{k-2} v_{k-2}$$
$$P_{k-1|k-2} = F_{k-2} P_{k-2|k-2} F_{k-2}^t + Q_{k-2}$$

Iter. $k$

$m_{k-1|k-2}$ $P_{k-1|k-2}$ $v_{k-1}$ $y_{k-1}$ $$K_{k-1} = P_{k-1|k-2} H_{k-1}^t \left(H_{k-1} P_{k-1|k-2} H_{k-1}^t + R_{k-1}\right)^{-1}$$
$$m_{k-1|k-1} = m_{k-1|k-2} + K_{k-1}\left(y_{k-1} - H_{k-1} m_{k-1|k-2}\right)$$
$$P_{k-1|k-1} = (I - K_{k-1} H_{k-1}) P_{k-1|k-2}$$
$$m_{k|k-1} = F_{k-1} m_{k-1|k-1} + B_{k-1} v_{k-1}$$
$$P_{k|k-1} = F_{k-1} P_{k-1|k-1} F_{k-1}^t + Q_{k-1}$$

Iter. $k+1$

$m_{k|k-1}$ $P_{k|k-1}$ $v_k$ $y_k$ $$K_k = P_{k|k-1} H_k^t \left(H_k P_{k|k-1} H_k^t + R_k\right)^{-1}$$
$$m_{k|k} = m_{k|k-1} + K_k\left(y_k - H_k m_{k|k-1}\right)$$
$$P_{k|k} = (I - K_k H_k) P_{k|k-1}$$
$$m_{k+1|k} = F_k m_{k|k} + B_k v_k$$
$$P_{k+1|k} = F_k P_{k|k} F_k^t + Q_k$$

Iter. $k+2$

$m_{k+1|k}$ $P_{k|k}$ $v_{k+1}$ $y_{k+1}$ $$K_{k+1} = P_{k+1|k} H_{k+1}^t \left(H_{k+1} P_{k+1|k} H_{k+1}^t + R_{k+1}\right)^{-1}$$
$$m_{k+1|k+1} = m_{k+1|k} + K_{k+1}\left(y_{k+1} - H_{k+1} m_{k+1|k}\right)$$
$$P_{k+1|k+1} = (I - K_{k+1} H_{k+1}) P_{k+1|k}$$
$$m_{k+2|k+1} = F_{k+1} m_{k+1|k+1} + B_{k+1} v_{k+1}$$
$$P_{k+2|k+1} = F_{k+1} P_{k+1|k+1} F_{k+1}^t + Q_{k+1}$$

Fig. 10

METHOD, DEVICE, AND SYSTEM FOR CONTROLLING STATE PARAMETER BY COMMUNICATING DEVICE

TECHNICAL FIELD

The present disclosure relates to communication systems and relates more specifically to the cooperative control of multiple communicating devices, a.k.a. multi-agent systems (MAS).

BACKGROUND ART

Cooperative control algorithms aim at enabling multiple communicating devices to fulfill a common goal.

For instance, the consensus algorithm aims at enabling multiple communicating devices to achieve an agreement on a state parameter. In practice, a number of communicating devices exchange data with their neighbors to agree on a value of the state parameter that enable them to work together in a coordinated fashion. When multiple communicating devices agree on the same value of the state parameter, they are said to have reached a consensus.

Cooperative control algorithms such as the consensus algorithm or the model predictive control (MPC) algorithm are often applied in formation control problems with applications to mobile robots, unmanned air vehicles (UAVs), autonomous underwater vehicles (AUVs), satellites, aircraft, spacecraft, automated highway systems, etc. Cooperative control algorithms can also be applied to non-formation related problems such as task assignment, payload transport, role assignment, air traffic control, synchronization, etc.

A typical application of a cooperative control algorithm such as a consensus algorithm can be to measure the average temperature in a geographical area from a set of remote sensors, or to control a platoon of vehicles on a highway in order to e.g. maintain the geometrical arrangement of the vehicles of the platoon substantially constant over time.

Typically, the communicating devices exchange their local values of the state parameter. Hence, each communicating device may update its own local value of the state parameter based on local values of the state parameter received from neighbor communicating devices.

An issue with the conventional cooperative control algorithms, such as the consensus algorithm, is that they assume that the local values of the state parameter are known perfectly. However, these local values of the state parameter are usually corrupted by e.g. an additive noise which may impact the convergence of the consensus algorithm.

In the scientific literature, solutions have been proposed relying on Kalman filter-based state observers for de-noising the observed local values of the state parameter in the context of a consensus algorithm. However, most solutions rely on a global formulation of the consensus algorithm, i.e. they are applicable only when each communicating device receives data from all the other communicating devices. However, in most practical systems, a communicating device can receive data only from some of the other communicating devices, and these solutions relying on a global formulation of the consensus algorithm are therefore not applicable as such. They may be applied by e.g. using multi-hop communications for enabling each communicating device to receive data from all the other communicating devices, as proposed in NPL 1. However, this solution implies that that consensus algorithm will converge more slowly and requires a significant increase of the amount of data exchanged between the communicating devices.

Another solution relying on a Kalman filter for de-noising the local values of the state parameter is proposed in NPL 2. In NPL 2, a Kalman filter based state observer may be implemented locally by each communicating device under some assumptions. However, the solution proposed in NPL 2 requires that each communicating device transmits to the other communicating devices, at each iteration of the consensus algorithm, a local covariance matrix of the local value of the state parameter. Hence, each communicating device transmits both its local value of the state parameter and its local covariance matrix, thereby resulting in a significant increase of the amount of data exchanged between the communicating devices.

Hence, the existing solutions are not directly applicable to the case where each communicating device receives data only from some of the communicating devices and/or require transmitting additional data which leads to a contradiction since this additional data will also be corrupted by noise.

CITATION LIST

Non Patent Literature

NPL 1

D. Haumann, V. Willert and A. Wahrburg, "Kalman filtering in mobile consensus networks", in 2012 IEEE International Symposium on Intelligent Control, Dubrovnik, Croatia, oct. 2012, p. 944-950.

NPL 2

Wei Ren, R. W. Beard and D. B. Kingston, "Multi-agent Kalman consensus with relative uncertainty", in Proceedings of the 2005, American Control Conference, 2005, Portland, OR, USA, 2005, p. 1865-1870.

SUMMARY OF INVENTION

The present disclosure aims at improving the situation, by overcoming at least some of the limitations of the prior art discussed above. In particular, the present disclosure aims at proposing a solution for de-noising the observations of the local values of the state parameter when each communicating device receives data only from some of the other communicating devices, without requiring increasing the amount of data to be exchanged.

For this purpose, and according to a first aspect, the present disclosure relates to a method for controlling a state parameter by a communicating device, referred to as processing device, in a set of communicating devices, said processing device storing a local value of the state parameter and exchanging data with other communicating devices to enable all communicating devices to converge towards having a same value of the state parameter, referred to as consensus value, wherein a subset of communicating devices is associated to said processing device, said subset including the processing device and the communicating devices from which the processing device receives data, said method comprising iterating steps of:

- receiving local values of the state parameter from the other communicating devices of the subset;
- updating its local value of the state parameter based on the received local values of the state parameter, wherein at least some of said received local values are corrupted by an observation noise;

transmitting its local value of the state parameter to other communicating devices;

wherein the processing device iteratively estimates an aggregated state parameter aggregating the local values of the state parameter of the communicating devices of the subset, based on the received local values of the state parameter, by using a Kalman filter which relies on a process model (a.k.a. state-space model) that includes a process noise to model the inaccuracy of the process model, said processing device updating its local value of the state parameter based on the estimated aggregated state parameter; and wherein the processing device iteratively determines a convergence level of the local values of the state parameter and controls a covariance matrix of the process noise based on the determined convergence level.

In specific embodiments, the method can further comprise one or more of the following features, considered either alone or in any technically possible combination.

In specific embodiments, the process model of the Kalman filter assumes that each communicating device of the subset associated to the processing device receives data only from communicating devices of said subset.

In specific embodiments, modifying the covariance matrix of the process noise comprises causing a norm of said covariance matrix to decrease as the local values of the state parameter converge.

In specific embodiments, the covariance matrix of the process noise is further modified based on a covariance matrix of the observation noise, and modifying the covariance matrix of the process noise comprises causing a ratio between a norm of the covariance matrix of the process noise and the norm of the covariance matrix of the observation noise to decrease as the local values of the state parameter converge.

In specific embodiments, the covariance matrix of the process noise corresponds to the covariance matrix of the observation noise multiplied by a positive weighting factor and modifying the covariance matrix of the process noise comprises causing the weighting factor to decrease as the local values of the state parameter converge.

In specific embodiments, determining the convergence level comprises estimating the consensus value and computing a distance between the local values of the state parameter and the estimated consensus value.

In specific embodiments, determining the convergence level by the processing device at an iteration k comprises computing a distance between two multivariate Gaussian random variables.

In specific embodiments, the two multivariate Gaussian variables comprise:

a random variable having a mean and a covariance matrix computed based on the local values of the state parameter observed over successive iterations; and a random variable representative of an estimate of the consensus value corrupted by the observation noise.

In specific embodiments, the distance computed is a Bhattacharyya distance.

In specific embodiments, the convergence level is determined based on a number of iterations of the updating step.

In specific embodiments, the processing device dynamically adapts the process model at each iteration to account for packets of data, containing updated local values, that were not received from other communicating devices of the subset.

According to a second aspect, the present disclosure relates to a computer program product comprising instructions which, when executed by a communication device comprising a communication unit and a processing circuit, configure said communication device to carry out a method according to any one of the embodiments of the present disclosure.

According to a third aspect, the present disclosure relates to a computer-readable storage medium comprising instructions which, when executed by a communication device comprising a communication unit and a processing circuit, configure said communication device to carry out a method according to any one of the embodiments of the present disclosure.

According to a fourth aspect, the present disclosure relates to a communicating device comprising a communication unit and a processing circuit configured to carry out a method according to any one of the embodiments of the present disclosure.

According to a fifth aspect, the present disclosure relates to a communication system comprising a plurality of communicating devices according to any one of the embodiments of the present disclosure.

The invention will be better understood upon reading the following description, given as an example that is in no way limiting, and made in reference to the figures.

BRIEF DESCRIPTION OF DRAWINGS

FIG. 10 is a representation of the successive steps of a Kalman filter.

DESCRIPTION OF EMBODIMENTS

Figure 1:
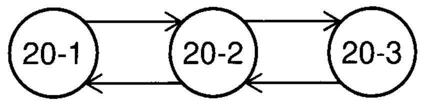
FIG. 1 is a schematic representation of a graph representing the communication links between communicating devices.

In these figures, references identical from one figure to another designate identical or analogous elements. For reasons of clarity, the elements shown are not to scale, unless explicitly stated otherwise.

As indicated above, the present disclosure relates to the cooperative control of a plurality of communicating devices.

We first present conventions used in the following description, and how the performance of a cooperative control algorithm may be evaluated.

A) Graph Theory

It is natural to model data exchange between communicating devices by directed/undirected graphs. A digraph (i.e. a directed graph) consists of a pair $(\aleph, \varepsilon)$, where $\aleph$ is a finite nonempty set of communicating devices and $\varepsilon \in \aleph^2$ is a set of ordered pairs of communicating devices, called directed edges ($\epsilon_{ij}$ is the directed edge or communication link from the communicating device j to the communicating device i). For simplification purposes, we use in the following "edge" rather than "directed edge" and "graph" rather than "digraph" (the context, i.e. directed or undirected is considered clear).

As a comparison, the pairs of communicating devices in an undirected graph are unordered. A directed path is a sequence of ordered edges in a digraph, of the form $\epsilon_{ij}$, $\epsilon_{ki}$, $\epsilon_{lk}$, . . . , where i, j, k, l, . . . $\in \aleph$, in a digraph. An undirected path in an undirected graph is defined analogously, where $\epsilon_{ij}$ implies $\epsilon_{ji}$. A digraph is called "strongly connected" if there is a directed path from every communicating device to every other communicating device. An undirected graph is called connected if there is a path between any distinct pair of communicating devices. A directed tree is a digraph in which every communicating device, except the root, has exactly one parent. A spanning tree of a digraph is a directed tree formed by graph edges that connect all the communicating devices of the graph. We say that a graph has (or contains) a spanning tree if there exists a spanning tree that is a subset of the graph. Note that the condition that a digraph has a spanning tree is equivalent to the case that there exists a communicating device having a directed path to all other communicating devices.

For a total number n of communicating devices, the adjacency matrix $A_n=[a_{ij}]_{0\le i,j\le n-1}$ of a deterministic digraph is defined as $a_{ii}=0$ and $a_{ij}=1$ if $\epsilon_{ij}\in\varepsilon$ where $i\neq j$. Setting $a_{ij}=0$ denotes the fact that a communicating device i does not (i.e. cannot or does not wish to) receive data from a communicating device j. The Laplacian matrix of the digraph is defined as $L_n=[l_{ij}]_{0\le i,j\le n-1}$ where $l_{ij}=-a_{ij}$ and $l_{ii}=\Sigma_j a_{ij}$, i.e.:

$$L_n = D_n - A_n$$

where $$D_n = \operatorname*{diag}_{0\le i\le n-1} l_{ii}$$

is ine in-degree matrix (number of communicating devices from which the communicating device i receives data). For an undirected graph, the Laplacian matrix is symmetric positive semi-definite.

FIG. 1 represents an undirected graph with n=3 communicating devices 20. In this figure, the communicating devices are referred to as 20-*k* with 1≤k≤n=3 in order to differentiate the communicating devices 20. The associated adjacency and Laplacian matrices are the following:

$$A_3 = \begin{bmatrix} 0 & 1 & 0 \\ 1 & 0 & 1 \\ 0 & 1 & 0 \end{bmatrix}$$

-continued $$L_3 = \begin{bmatrix} 1 & -1 & 0 \\ -1 & 2 & -1 \\ 0 & -1 & 1 \end{bmatrix}$$

B) Consensus Algorithms

Let $x_i(t)\in\mathbb{R}^m$ be the local value of the state parameter of the $i^{th}$ communicating device. The state parameter represents the parameter that needs be coordinated between communicating devices, by using e.g. a consensus algorithm. The state parameter may be for instance the communicating device's position, velocity, oscillation phase, etc.

A continuous-time single-integrator static consensus algorithm can be summarized as:

$$\dot{x}_i(t) = -\sum_{j\in\Theta_i(t)} \alpha_{ij}(t)(x_i(t) - x_j(t))$$

wherein $\Theta_i(t)$ represents the subset of $n_i$ communicating devices whose local values of the state parameter are available to the i-th communicating device at time t (defined by the adjacency matrix) and $a_{ij}(t)$ denotes a positive possibly time-varying weighting coefficient. In other words, the local control information of each communicating device is driven toward the states of the local control information of its (possibly time-varying) neighbors at each time. It is common to extend the adjacency matrix for a weighted digraph $$A_n^w = \left[a_{ij}^w\right]_{0\le i,j\le n-1}$$

defined as $$a_{ij}^w = \alpha_{ij}$$

if $(j,i)\in\varepsilon$ where $i\neq j$ and $$a_{ij}^w = 0$$

otherwise.

The continuous-time consensus algorithm can be written in matrix form:

$$\dot{x}(t) = -[L_n^w(t)\otimes I_m]x(t)$$

wherein $x=[x_0(t), x_1(t), \ldots, x_{n-1}(t)]^t$ is the global aggregated state parameter comprising the local values of the state parameter of all the communicating devices, $$L_n^w = D_n^w - A_n^w,$$

$I_m$ is the identity matrix with size m, $\otimes$ the Kronecker matrix product.

In the following description, we consider in a non-limitative manner the discrete version of the single-integrator static consensus algorithm. It is assumed that the communicating devices update their local values of the state parameter recurrently in time and transmit in the same time interval the updated values over the communication links. Each communicating device updates its local value of the state parameter according to:

$$x_{i,k} = x_{i,k-1} - \sum_{j \in \Theta_i(k)} \alpha_{ij}(k)(x_{i,k-1} - x_{j,k-1})$$

In the following description, we consider in a non-limitative manner the case where the consensus algorithm is applied with a single weighting coefficient α for all the communicating devices:

$$x_{i,k} = x_{i,k-1} - \alpha \sum_{j \in \Theta_i(k)} (x_{i,k-1} - x_{j,k-1})$$

This system can also be expressed as:

$$\begin{cases} x_{i,k} = x_{i,k-1} + u_{i,k} \\ u_{i,k} = -\alpha n_i x_{i,k-1} + \alpha\left[1_{n_i}^t \otimes I_m\right]\breve{x}_{k-1}^{(i)} \end{cases}$$

wherein:

$$\breve{x}_k^{(i)} = \left[[x_{j,k}]_{j \in \Theta_i(k)}^t\right]^t$$

is an aggregated state parameter (vector) of the $n_i$ communicating devices in the subset $\Theta_i(k)$ whose local values of the state parameter are available at time k;

$$1_p = [1]_{0 \le i \le p-1}^t.$$

Figure 2:
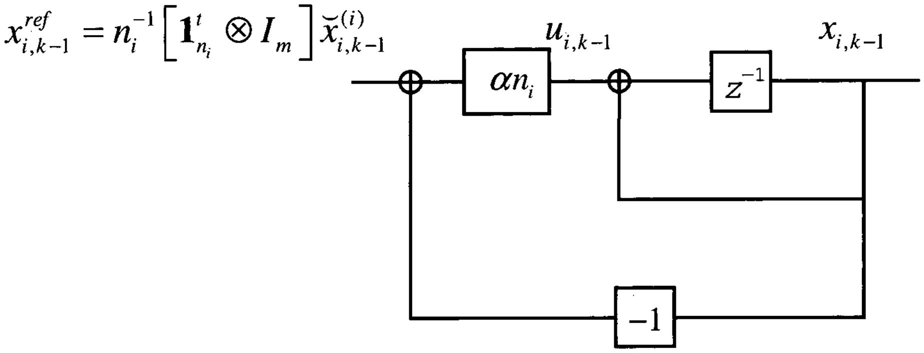
FIG. 2 is a local representation of a consensus algorithm.

The corresponding system is depicted in FIG. 2, and can be viewed as a first-order integrator driven by the command signal $u_{i,k}$ built as the weighted superposition of a feedback loop $-x_{i,k-1}$ and an exogeneous reference signal bringing the contribution of the other communicating devices.

For the global aggregated state parameter, we have:

$$x_k = [W_{n,k-1} \otimes I_m]x_{k-1}$$

wherein:

$$W_{n,k} = I_n - \alpha L_{n,k},\ L_{n,k} = D_{n,k} - A_{n,k}$$

wherein $D_{n,k}$ and $L_{n,k}$ are the in-degree and Laplacian matrices corresponding to a non-weighted digraph ($a_{ij}=0$ or $a_{ij}=1$).

For the global aggregated state parameter, the system can further be written as:

$$\begin{cases} x_k = x_{k-1} + u_{k-1} \\ u_k = -\alpha[L_{n,k} \otimes I_m]x_k \end{cases}$$

Figure 3:
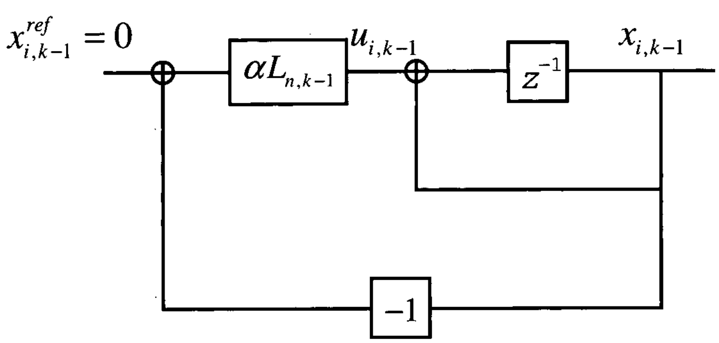
FIG. 3 is a global representation of a consensus algorithm.

The corresponding system for the global aggregated state parameter is depicted on FIG. 3. Logically, the overall system is endogenous, i.e. it is built as a first order integrator with a feedback loop driven by the global aggregated state parameter and no external reference signal, the controller being here the weighted Laplacian matrix. The command signal is built from the observation of the integrator output.

In the case of a deterministic graph, it can be shown that as long as the Laplacian is connected ($\lambda_2(L_n)>0$ wherein $\lambda_2(L_n)$ corresponds to the second smallest eigenvalue of the so-called Laplacian matrix $L_n$), the system converges if $\alpha \le 1/\deg_{max}$ where $\deg_{max}$ is the maximum degree of the graph, i.e. the maximum number of neighbors a communicating device communicates with. Note that in such a case, the matrix $W_{n,k}$ is stochastic, i.e. with rows that sum up to one and with a positive diagonal.

To illustrate the behavior of the consensus algorithm, let's first assume that each communicating device receives a scalar information from all the other communicating devices at all times. Thus, we have:

$$x_k = I_n x_{k-1} - \left[I_n - \bar{J}_n\right]x_{k-1} = \bar{J}_n x_{k-1} = \bar{J}_n^{k+1} x_0$$

wherein $$\bar{J}_n = \frac{1}{n}J_n,\ J_n = 1_n 1_n^t \text{ and } 1_n = [1]_{0 \le i \le n-1}^t$$

the all-one vector. Finally, as matrix $\bar{J}_n$ is idempotent $$(\bar{J}_n^{k+1} = \bar{J}_n),$$

we obtain:

$$x_k = \bar{J}_n x_0 = 1_n\left(\frac{1}{n}1_n^t x_0\right) \triangleq 1_n \bar{x}_0$$

The local value of the state parameter of all the communicating devices converges to the same value that is the average of the initial local values. In such a case, we talk about the average consensus. Note that the terminology average is sometimes used to describe all the situations where the consensus converges towards a weighted average of the initial local values. The convergence of the discrete time consensus algorithm can actually be generalized to other matrices $W_{n,k}$. It actually suffices that $$\lim_{k \to \infty} W_{n,k} \to 1_n v^t,$$

where ν is a column vector.

It can be shown that for a directed graph, the discrete-time consensus algorithm achieves consensus asymptotically if and only if the matrix $W_n$ has a single unitary eigenvalue associated to the eigenvector $1_n$, i.e. $\lambda_2(W_n)<1$ wherein $\lambda_2(W_n)$ corresponds to the second largest eigenvalue of the matrix $W_n$ (similarly $\lambda_2(L_n)>0$ wherein $\lambda_2(L_n)$ corresponds to the second smallest eigenvalue of the so-called Laplacian matrix $L_n$ with an additional constraint on the weighting coefficient). This results actually means that the digraph has a spanning tree (i.e. there is no two separate graphs in the topology). Then, the consensus algorithm converges towards:

$$x_k \to (1_n v^t \otimes I_m) x_0$$

wherein $v = [v_i]_{0 \le i \le n-1} \ge 0$ satisfies $v^t W_n = v^t$ and $$1_n^t v = 1,$$

i.e. $v$ is the left row eigenvector of $W_n$ associated with eigenvalue 1. This means that the global aggregated state parameter of the communicating devices converges towards the same linear combination of the initial global aggregated state parameter $x_0$, not necessarily the mean value. As left and right eigenvalues of a square matrix are the same, every stochastic matrix has, at least, one row eigenvector associated to the eigenvalue 1. In order to obtain an average consensus, i.e., $$v = \frac{1}{n} 1_n$$

the matrix $W_n$ needs only to be doubly stochastic. It is actually known that the discrete-time consensus algorithm can achieve average consensus asymptotically if and only if the directed graph is strongly connected (there is a spanning tree for each communicating device) and degree-balanced (each communicating device has the same number of connections in both directions—the in-degree equals the out-degree).

For an undirected graph, the discrete-time consensus algorithm can achieve consensus asymptotically if and only if the matrix $W_n$ has a single unitary eigenvalue associated to the eigenvector $1_n$. From the topology point of view, it means that the graph is connected. If an undirected graph has a spanning tree, then it is necessarily strongly connected and balanced ($W_n$ is symmetric and thus doubly stochastic). The consensus algorithm converges in average.

C) Impact of Noisy Values of the State Parameter

Without losing in generality, the consensus algorithm is now described for a scalar state parameter (i.e. m=1).

Multi-agent and more generally control systems are subject to different sources of errors which can be modelled in the control systems as additive noises. These sources of errors are mainly of two types, namely disturbances and observation (or measurement) noises.

Typical types of "real" disturbances are gusts of wind or frictions in motors for moving vehicles. If these disturbances cannot be measured to be considered by the controller, the control system may reach different state values for the same command. It is thus important to consider the impact of these disturbances in order to drive the control system to the reference state. This is precisely the advantage of closed-loop controlled systems to be able to cope with disturbances. Disturbances can occur either as the input or the output of the control system. Disturbances can also be somehow "virtual" when designing a controller relying on a model that does not reflect accurately the behavior of the actual system.

In the general case of a first-order consensus algorithm, the disturbance can be modelled as follows:

$$x_{i,k} = x_{i,k-1} + u_{i,k-1} + q_{i,k-1}$$

wherein $q_{i,k}$ is the input additive disturbance that affects the control system. This kind of disturbance is also commonly referred to as a process noise.

The present disclosure aims at mitigating the impact of the second source of errors, i.e. the observation (or measurement) noises. In order to build the command signal of closed-loop systems, it is required to know the value of the system's state. But the state is often not observed directly but combined with an additive observation noise. Dealing with multi-agent systems, the observation noise can originate from the transmission itself. This would be the case e.g. for signals transmitted using an analogue modulation. Analogue signals are indeed observed with an additive degradation possibly brought by the propagation channel but essentially by the first stages of the receiver (thermal noise). In the general case of a single integrator consensus algorithm, we have for the i-th communicating device:

$$x_{i,k} = x_{i,k-1} + u_{i,k-1}$$

wherein the command signal $u_{i,k}$ is built from the state parameter local value $x_{i,k}$ of the i-th communicating device and the observation of the neighbor's state parameter local values $$\breve{x}_k^{(i)}.$$

Due to the noise, the i-th communicating device does not observe the actual state parameter local values of its neighbors $$\breve{x}_k^{(i)}$$

but noisy versions instead:

$$\breve{y}_k^{(i)} = \breve{x}_k^{(i)} + \breve{\eta}_k^{(i)}$$

wherein:

$$\breve{y}_k^{(i)} = \left[ [y_{j,k}]^t_{j \in \Theta_i(k)} \right]^t$$

is an aggregated state parameter observation (vector) of the $n_i$ communicating devices in the subset $\Theta_i(k)$ whose local values of the state parameter are available at time k, $y_{j,k}$ being the (noisy) state parameter local value obtained for the j-th communicating device;

$$\breve{\eta}_k^{(i)} = \left[ [\eta_{ij,k}]^t_{j \in \Theta_i(k)} \right]^t$$

is the aggregated vector of the noise values affecting the local values of the state parameter coming from the $n_i$ neighbors of the i-th communicating device, $n_{ij,k}$ being the noise component added to the local value of the state parameter transmitted from the j-th communicating device to the i-th communicating device.

In such a case, the noise is edge-dependent, i.e. the local value of the state parameter coming from a given communicating device is observed by its neighbors with a different noise component.

Figure 4:
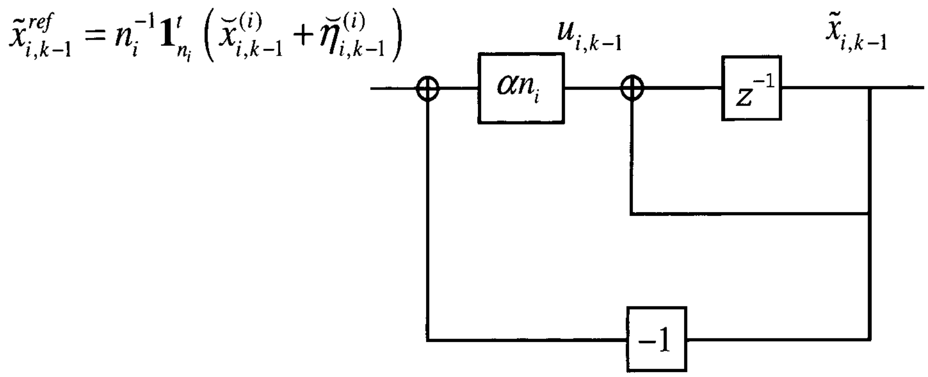
FIG. 4 is a local representation of a noisy consensus algorithm.

Without applying any method for reducing the impact of the observation noise, the consensus algorithm is built by feeding back the noisy observations. The discrete-time consensus algorithm, as applied by the i-th communicating device, can be expressed as:

$$\tilde{x}_{i,k} = \tilde{x}_{i,k-1} - \alpha\left(n_i \tilde{x}_{i,k-1} - 1_{n_i}^t\left(\breve{x}_{k-1}^{(i)} + \breve{\eta}_k^{(i)}\right)\right)$$

wherein $\tilde{x}_{i,k}$ is the local value of the state parameter of the noisy consensus algorithm for the i-th communicating device. Note that the number of neighbors $n_i$ can change with time according to the status of the transmission, and that it can vary from a communicating device to the other. The corresponding system, as seen by the i-th communicating device, is depicted in FIG. 4.

Modelling the impact of the transmission and edge-dependent noise for the global system, i.e. for the global aggregated state parameter, is not straightforward as the noise component is different over each edge departing from a same communicating device.

Figure 5:
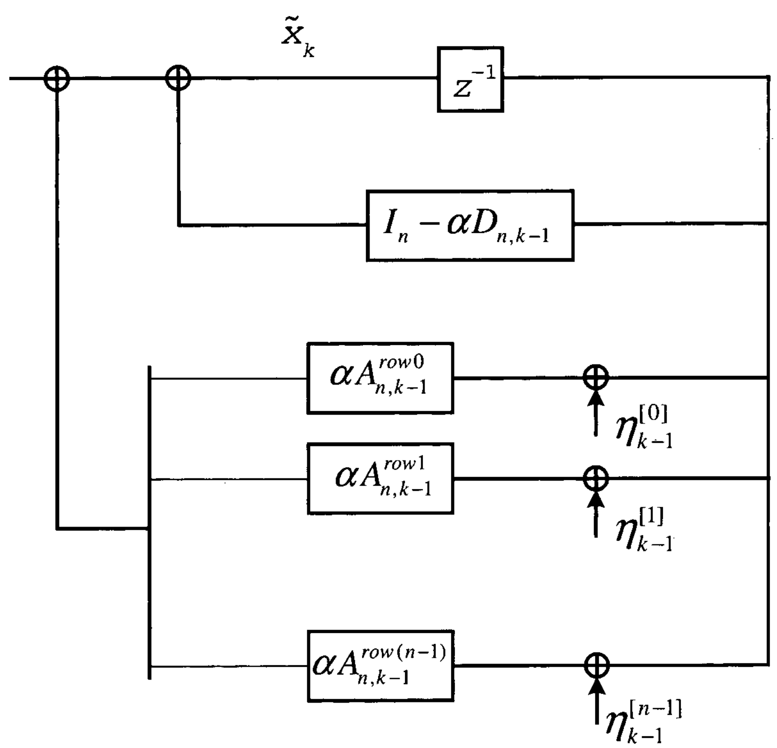
FIG. 5 is a global representation of a noisy consensus algorithm.

The global system can be interpreted as shown in FIG. 5 where the aggregated state parameter is observed over n parallel lines with a different noise component over each line. In this figure, $$A_{n,k}^{row\,i}$$

is the row i of the adjacency matrix $A_{n,k}$ and $$\eta_k^{[i]}$$

is the vector with size n populated with the noise components in $$\breve{\eta}_k^{(i)}$$

at the positions of the neighbors connected to the i-th communicating device and zero elsewhere. Thus, over each line we have:

$$y_{i,k} = A_{n,k}^{row\,i}\left(x_k + \eta_k^{[i]}\right) = x_{i,k} + \xi_{i,k}$$

wherein:

$$\xi_{i,k} = \alpha 1_{n_i}^t \breve{\eta}_k^{(i)} = \alpha A_{n,k}^{row\,i} \eta_k^{[i]}$$

Figure 6:
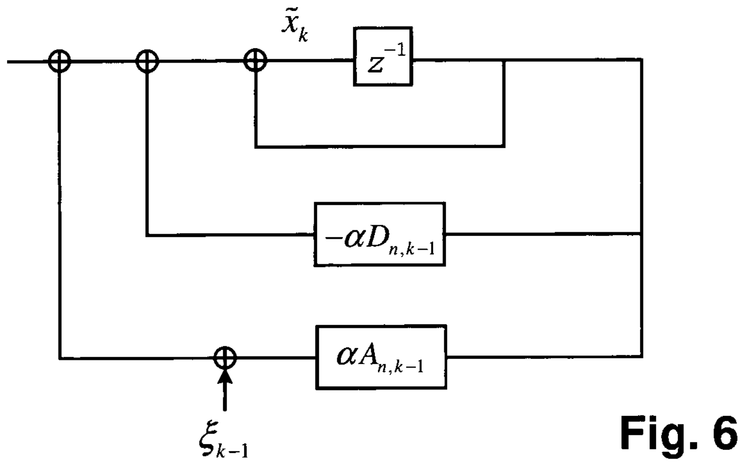
FIG. 6 is a global representation of a noisy consensus algorithm.

The n parallel branches can finally be replaced by a single branch where the state is observed through the matrix $\alpha A_{n,k}$ as follows:

$$y_k = \alpha A_{n,k} x_k + \xi_k$$

wherein $\xi_k = [\xi_{0,k}, \xi_{1,k}, \ldots, \xi_{n-1,k}]^t$. The corresponding system is depicted in FIG. 6. The command signal is built from the noiseless observation of the state parameter local values while the second component (neighbors' contribution) shall be built from the noisy observation introduced above. Without applying any method for reducing the impact of the observation noise, the consensus is built by feeding back the noisy observations:

$$\tilde{x}_k = \tilde{x}_{k-1} - \alpha D_{n,k-1}\tilde{x}_{k-1} + (\alpha A_{n,k-1}\tilde{x}_{k-1} + \xi_{k-1})$$

The occurrence of an additive transmission noise component is not so common as multi-agent systems rely most of the time on digital modulations where the transmission impairments result in the information being properly received or not received at all (packet loss). The state parameter local value can nonetheless be degraded by the noise resulting e.g. from the quantization of the local value prior to transmission. The local value can itself be observed with noise, e.g. when the position of the communicating device after being driven by the integrator is refreshed using a positioning technology (e.g. GNSS). In such a case, the noise is communicating device-dependent (and edge-independent), i.e. the same noisy local value is transmitted to all the neighbors of the communicating device. In the case the noise only affects the value transmitted by the communicating device to its neighbors, the situation is like the transmission noise described before. Each communicating device shall build the command signal $u_{i,k}$ using the local state value $x_{i,k}$ and the noisy observation of the neighbor's state values $$\breve{y}_k^{(i)}:$$

$$\breve{y}_k^{(i)} = \breve{x}_k^{(i)} + \breve{\eta}_k^{(i)}$$

wherein:

$$\breve{\eta}_k^{(i)} = \left[[\eta_{j,k}]_{j\in\Theta_i(k)}^t\right]^t$$

is the aggregated vector of the noise values affecting the state parameter local values coming from the $n_i$ neighbors of the i-th communicating device, $\eta_{j,k}$ being the noise component added to the state parameter local value received by the i-th communicating device (and by all the neighbors) from the j-th communicating device where $j \in \Theta_i(k)$.

In the case the local state value is also affected by noise, the i-th communicating device shall build the command signal from the observation:

$$y_k^{(i)} = x_k^{(i)} + \eta_k^{(i)}$$

wherein:

$$y_k^{(i)} = \left[y_{i,k}, [y_{j,k}]^t_{j\in\Theta_i(k)}\right]^t$$

is the aggregated state parameter observation (vector)

$$\breve{y}_k^{(i)}$$

augmented with the local observation of the state parameter of the i-th communicating device; and:

$$\eta_k^{(i)} = \left[\eta_{i,k}, [\eta_{j,k}]^t_{j\in\Theta_i(k)}\right]^t$$

is the aggregated vector $$\breve{\eta}_k^{(i)}$$

of the noise values augmented with the noise component affecting the state parameter local value of the i-th communicating device.

In the case the local state value of the i-th communicating device is not affected by noise, the noise component reduces to $$\eta_k^{(i)} = \left[0, [\eta_{j,k}]^t_{j\in\Theta_i(k)}\right]^t.$$

Figure 7:
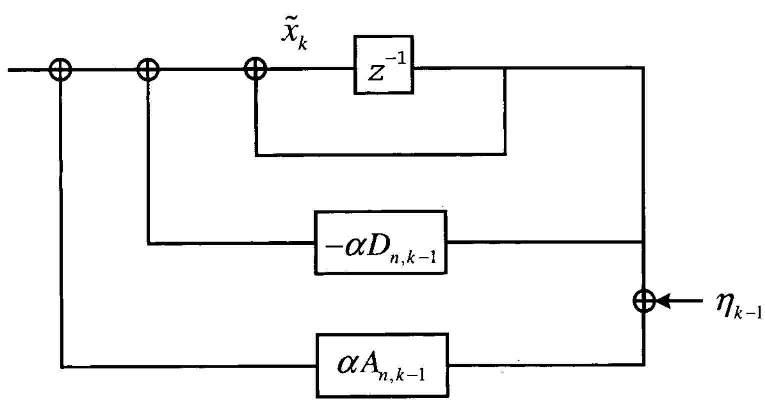
FIG. 7 is a global representation of a noisy consensus algorithm.
Figure 8:
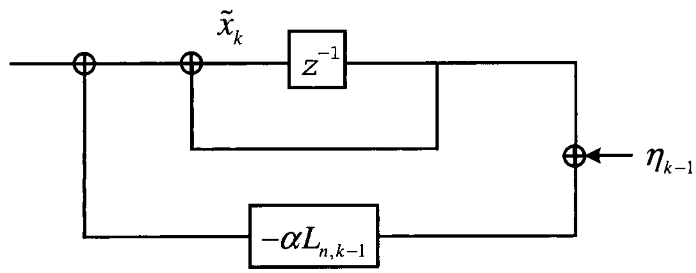
FIG. 8 is a global representation of a noisy consensus algorithm.

Dealing with the global system, the two previous situations simply differ from the way the command signal is built. In both cases, the output of the integrator is directly observed with noise as follows:

$$y_k = x_k + \eta_k$$

wherein $\eta_k=[\eta_{0,k}, \eta_{1,k}, \ldots, \eta_{n-1,k}]^t$. As shown in FIG. 7, in the case of the noise component affecting only the state parameter local values transmitted to the neighbors, one part of the command signal is built from the noisy observation while a second one relying on the inner state parameter local value uses the noiseless observation. In the case of the noise component also affecting the inner state parameter local value, the overall command signal is computed from the noisy observation (see FIG. 8).

At this stage, it is important to emphasis on a misleading aspect of the global description of the consensus algorithm. One may notice that as the global aggregated state parameter is available from the first feedback branch in FIG. 6, this information could be used to compute the contribution of the third branch avoiding the noise. It should not be forgotten that the consensus algorithm is a distributed algorithm. As a matter of fact, the first branch is a diagonal matrix that corresponds to each communicating device's own local value of the state parameter. The second branch, the adjacency matrix, brings to each communicating device the knowledge of its neighbors' local values. This second branch is thus the heart of the consensus algorithm.

The present disclosure aims at reducing the impact of the observation noise onto the performance of the consensus algorithm. In all the situations introduced above for measurement or observation noise, the noisy consensus algorithm can be modelled as:

$$\tilde{x}_k = W_{n,k-1}\tilde{x}_{k-1} + \xi_{k-1}$$

where the situation differs in the construction of the noise component $\xi_k$. It can easily be shown that this algorithm can be rewritten as follows:

$$\tilde{x}_k = x_k + c_k$$

where:

$$\begin{cases} x_k = W_{n,k-1}x_{k-1} \\ c_k = W_{n,k-1}c_{k-1} + \xi_{k-1} \end{cases}$$

The value obtained from the noisy consensus is thus the superposition of the noiseless value (the expected one) superimposed with a correlated and colored noise. As an autoregressive process with order 1, the component $c_k$ behaves similarly to a random walk. It results that the noisy consensus algorithm cannot converge to an equilibrium value as such.

D) De-Noising the Consensus Algorithm

A possible approach is to mitigate the level of noise onto the observations (a.k.a. de-noising). The most common approach is to rely on stochastic signal processing algorithms where part of or all the variables are described as random processes with some known statistics. As shown in the equations above, the noisy consensus algorithm can be expressed as the superposition of the noiseless consensus value with a colored and correlated noise. This can be viewed as the estimation of the process $x_k$ from the noisy observations $\tilde{x}_k$ where the process of interest is described by the linear state-space equations:

$$\begin{cases} x_k = W_{n,k-1}x_{k-1} \\ \tilde{x}_k = x_k + c_k \end{cases}.$$

Assuming Gaussian observations, the problem falls in the framework of the well-known Kalman filtering.

E) Kalman Filtering

The Kalman filtering is the closed form solution of the more general Bayesian recursive filtering when the measurements and observations are linear Gaussian. Generally, the model is described as follows $$\begin{cases} x_k = F_{k-1}x_{k-1} + B_{k-1}v_{k-1} + q_{k-1} \\ y_k = H_k x_k + r_k \end{cases}.$$

where:

- $x_k$ is the state value to be estimated;
- $F_k$ is the n×n state-transition matrix;
- $v_k$ is a deterministic control vector;
- $B_k$ is the n×n command-input matrix;
- $q_k$ is the process noise (a.k.a. state or system noise) that describes the uncertainty about the model, assumed to be drawn from a zero-mean Gaussian process $\mathcal{N}(0, Q_k)$ with covariance matrix $Q_k$;
- $y_k$ is the state observation (or measurement) vector;
- $H_k$ is the m×n observation matrix;
- $r_k$ is the observation noise that is assumed to be drawn from a zero-mean Gaussian process $\mathcal{N}(0, R_k)$ with covariance matrix $R_k$.

The processes $r_k$ and $q_k$ are assumed uncorrelated with each other. The initial state, and the noise vectors at each step are all assumed to be mutually independent.

The Bayesian filter recursively computes the marginal distribution $p(x_k|y_{0:k})$ of the state value $x_k$ that from the observations $y_0, y_1, \ldots, y_k$. In this specific case, we have a probabilistic state space model where $$p(x_k \mid x_{k-1}) = N(F_{k-1}x_{k-1} + B_{k-1}v_{k-1}, Q_k)$$
$$p(y_k \mid x_k) = N(H_k x_k, R_k)$$

As the distribution $p(x_k|y_{0:k})$ is Gaussian, the filtering reduces to the estimation of its mean and covariance matrix $$p(x_k \mid y_{0:k}) = N(m_k, P_{k|k})$$

where:

$$\begin{cases} m_k = E(x_k \mid y_{0:k}), \\ P_{k|k} = E(x_k - m_k)(x_k - m_k)^t \end{cases}$$

The Kalman filter is a linear recursive estimator of the unknow state. At each iteration, it produces an estimate of the mean and covariance matrix. The Kalman filter can be written as a single equation but according to the Bayesian methodology, it is most often described as a two-phase algorithm. The prediction phase uses the state estimate from the previous iteration to produce an estimate of the state at the current iteration using the knowledge of the model. This predicted state estimate is also known as the a priori state estimate because, although it is an estimate of the state at the current iteration, it does not include observation information from the current iteration. In the update phase, the current a priori prediction is combined with the current observation information to refine the state estimate. This improved estimate is termed the a posteriori state estimate. The Kalman equations are summarized in Table I below.

TABLE I

| | |
|---|---|
| Prediction (from model) | $p(x_k\|y_{0:k-1}) = \mathcal{N}(m_{k\|k-1}, P_{k\|k-1})$ |
| Predicted (*a priori*) mean estimate | $m_{k\|k-1} = F_{k-1}m_{k-1\|k-1} + B_{k-1}v_{k-1}$ |
| Predicted (*a priori*) covariance estimate | $P_{k\|k-1} = F_{k-1}P_{k-1\|k-1}F_{k-1}^t + Q_{k-1}$ |
| Prediction of the observation | $p(y_k\|y_{0:k-1}) = \mathcal{N}(H_k m_{k\|k-1}, S_k)$ |
| | $S_k = H_k P_{k\|k-1} H_k^t + R_k$ |
| Update (from observation) | $p(x_k\|y_{0:k}) = \mathcal{N}(H_k m_{k\|k-1}, S_k)$ |
| Innovation (unbiased) | $i_k = y_k - H_k m_{k\|k-1}$ |
| Optimal Kalman gain | $K_k = P_{k\|k-1} H_k^t S_k^{-1}$ |
| Updated (*a posteriori*) mean estimate | $m_{k\|k} = m_{k\|k-1} + K_k i_k$ |
| Updated (*a posteriori*) covariance estimate | $P_{k\|k} = (I - K_k H_k)P_{k\|k-1} = P_{k\|k-1} - K_k S_k K_k^t$ |

From the knowledge of the marginal probability density function $p(x_k|y_{0:k})$, it is possible to build any estimator of the state. The most common one is the minimum MSE (MMSE). At each iteration, the filter produces the estimate $\hat{x}_{k|k}$ of the state that from the observations $y_0, y_1, \ldots, y_k$ minimizes the mean square error:

$$\hat{x}_{k|k} = \underset{x}{\operatorname{argmin}} \mathbb{E}\left[\left\|\hat{x}_{k|k} - x_k\right\|^2 \,\middle|\, y_{0:k}\right] = \mathbb{E}[x_k \mid y_{0:k}] = m_{k|k}$$

Also note that we have:

$$\mathbb{E}[(x_k - \hat{x}_k)^t(x_k - \hat{x}_k) \mid y_{0:k}] = \text{trace}\left(P_{k|k}\right)$$

The Kalman filter is the optimal linear filter in cases where a) the model perfectly matches the real system, b) the entering noise is white (uncorrelated) and c) the covariances of the noise are exactly known. In such a case, the Kalman filter is unbiased and is from that respect the minimum unbiased variance estimator (MVUE) and in this specific case, the best linear unbiased estimator (BLUE). Many variations exist such as the information filter, and the family of the extended Kalman filters designed to deal with non-linear models.

As previously explained, the noisy consensus system is compatible with the Kalman filtering for de-noising the underlying consensus value. However, this is not strictly accurate as the noise process $c_k$ is not i.i.d. but coloured owing to its autoregressive (AR) structure. Some approaches have been devised for handling such situations starting with a state-augmented algorithm where the colored noise is added to the state to be estimated. However, the state-augmented approach is known to suffer from implementation instability.

F) State Observer

In the sequel, the notation $\tilde{x}_k$ is replaced by $x_k$ to simplify the notations (the value of the noiseless consensus algorithm is no more considered). Kalman filtering can also be used for de-noising systems according to the state-observer principle. Let's first remind the principle of the state-observer principle in the deterministic linear case. The state of a linear, time-invariant physical discrete-time system is assumed to satisfy:

$$\begin{cases} x_k = Fx_{k-1} + Bv_{k-1} \\ y_k = Hx_k \end{cases},$$

where $x_k$ is the system's state, $v_k$ its input and $y_k$ its output. For control purposes the system state is fed back to the input of the system through a diagonal gain matrix $v_k = Gx_k$.

For simplicity, it is assumed that the reference is zero $$(x_k^{ref} = 0).$$

As shown in the equations above, the system state is not observed as such but through the observation matrix H. It is thus required to first estimate the state in order to close the loop. This can be done using e.g. the so-called Luenberger observer defined by the equations below:

$$\begin{cases} \hat{x}_k = F\hat{x}_{k-1} + Bv_{k-1} + K_L(y_{k-1} - \hat{y}_{k-1}) \\ \hat{y}_k = H\hat{x}_k \end{cases}$$

Figure 9:
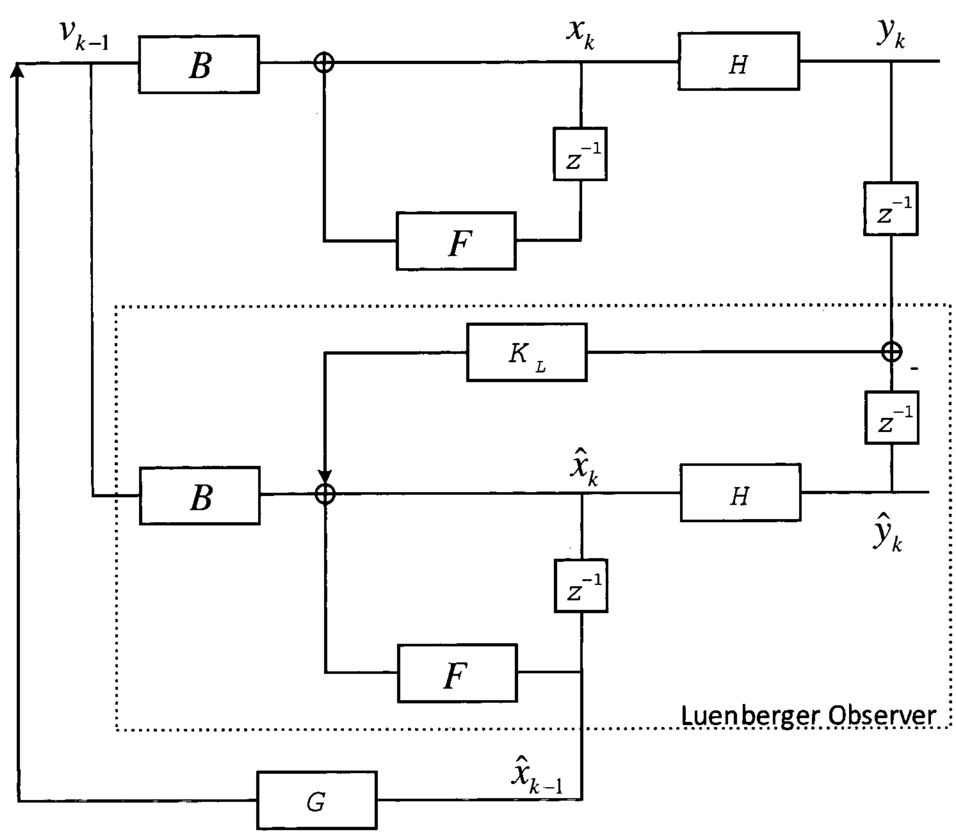
FIG. 9 is a representation of a Luenberger observer.
Figure 11:
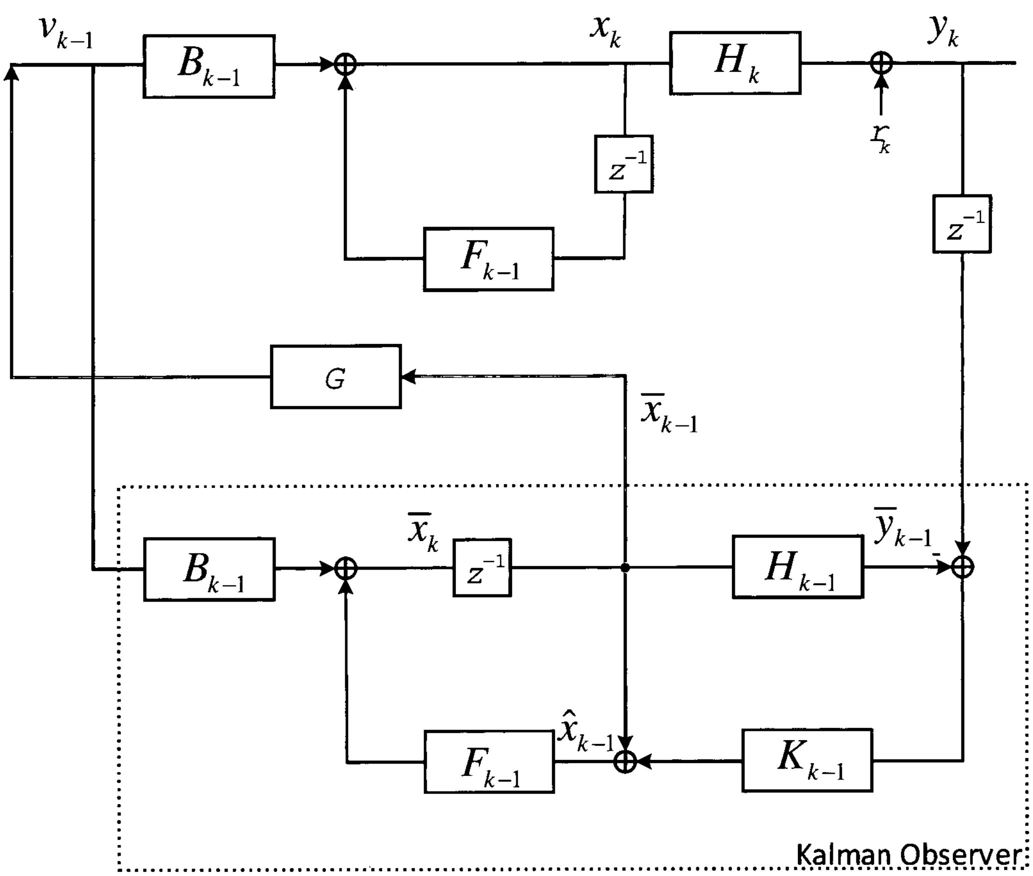
FIG. 11 is a representation of a Kalman filter-based state observer.

The principle of the Luenberger state observer is graphically depicted in FIG. 9. Basically, the Luenberger observer makes use of a model of the system driven by an error signal between the true system's output and the model's output. It can be shown that the Luenberger observer for this discrete-time system is asymptotically stable (the error on the state converges to 0) when the matrix $F-K_LH$ has all the eigenvalues inside the unit circle. Upon appropriately selecting the Luenberger matrix gain $K_L$, it is therefore possible to feed back the output of the observer system to the input of both the observer and the system through the gain matrix $v_k = G\hat{x}_k$. Note that the command signal $u_k = Bv_k$ can be built not only from the estimation of the state $\hat{x}_k$ but also from a partial knowledge of the state as previously described for the noisy consensus. However, it is always required to estimate the state value from noisy observations.

The principle of the Luenberger observer can be extended to systems with additive perturbations. It can be noticed that the Luenberger observer closely resembles the Kalman filter. The Kalman filter is itself a dynamic state observer in the case of stochastic additive noises. The model of the system is modified as follows with the insertion of the process and measurement noise contributions:

$$\begin{cases} x_k = F_{k-1}x_{k-1} + B_{k-1}v_{k-1} + q_{k-1} \\ y_k = H_kx_k + r_k \end{cases}$$

wherein $q_k$ is a process noise and $r_k$ an observation noise. The process noise shall not be confused with the input noise. The process noise models the relevance of the model while the observation noise models both the input and output noise added to the states before observation. Then, the state may be estimated using the Kalman equations as:

$$\begin{cases} \hat{x}_k = F_{k-1}\hat{x}_{k-1} + B_{k-1}v_{k-1} + K_k(y_k - \overline{y}_k) \\ \overline{y}_k = H_k(F_{k-1}\hat{x}_{k-1} + B_{k-1}v_{k-1}) \end{cases}$$

where to connect with the Kalman filter notations provided above, we have $$\begin{cases} \hat{x}_k = m_{k|k} \\ \overline{y}_k = Hm_{k|k-1} \\ m_{k|k-1} = Fx_{k-1} + Bv_{k-1} \\ i_k = y_k - \overline{y}_k \\ K = K_k,\ H = H_k,\ B = B_k,\ F = F_k \end{cases}$$

From the previous equations, it appears that the Kalman filter generates an estimate of the state at iteration k from the measurement obtained at iteration k. This is made possible thanks to the prediction stage of the Kalman filter.

Dealing with the consensus algorithm, the observation is available with a delay of one iteration, since the respective local values of the neighbors are first updated by said neighbors and transmitted afterwards. To overcome this issue, it is possible to rely on e.g. the output of the prediction stage of the Kalman filter for the current iteration or, in the case of distributed algorithms where the system can be updated sequentially after the Kalman filter, to use the output of the updating stage of the Kalman filter which uses the observations of the previous iteration.

Looking at the equations, it can be noticed that the prediction steps at iteration k depend only on the inputs at iteration k−1, and can thus be computed at iteration k. On the other hand, the update steps require the knowledge of the observation input $y_k$ and matrix $H_k$ that will be available with a delay of one iteration. To comply with the constraints, the equations of the Kalman filter are simply re-ordered as shown on FIG. 10. In FIG. 10, the part on the left corresponds to the conventional Kalman filter, wherein the iterations k−1, k and k+1 correspond to the conventional iterations of the Kalman filter. The part on the right corresponds to the equations of the Kalman filtered arranged according to the iterations k, k+1 and k+2 of the consensus algorithm. Basically, the Kalman predictor is used according to the following equations at iteration k:

prediction of the previous observation: $\overline{y}_{k-1} = H_{k-1}\overline{x}_{k-1}$;

estimation of the previous state: $\hat{x}_{k-1} = \overline{x}_{k-1} + K_{k-1}(y_{k-1} - \overline{y}_{k-1})$;

prediction of the current state: $\overline{x}_k = F_{k-1}\hat{x}_{k-1} + B_{k-1}v_{k-1}$.

The principle of using the Kalman filter as a state-observer in a closed-loop system is depicted on FIG. 9 where the system closes the loop with $v_k = G\overline{x}_k$. However, it should be noted that other implementations of Kalman filter-based state observers may be used in the present disclosure. For instance, another alternative is simply to use the Kalman gain in the Luenberger observer.

G) Application of the State Observer to the Noisy Consensus

As discussed above, the consensus algorithm can be described in different manners according to the nature of the noise, and the present disclosure aims at mitigating the impact of measurement or observation noise. The different situations described above differ on whether the component of the command signal depending on the local values of the state parameter is built from noisy observations and on whether the state parameter local values are observed with noise directly or through an observation matrix. Without losing in generality, the application of the state observer is described here in two situations, for a communicating device dependent noise where the command signal is built entirely from the noisy observation and for a transmission edge-dependent noise.

a) Structure (a)—Communicating Device Dependent Noise

In this structure, the consensus algorithm is modelled as a single integrator which output is directly observed with an additive noise component. As shown in Table II, the integrator shall be controlled by means of a feedback loop built from the state value applied to the Laplacian matrix.

TABLE II

| | |
|---|---|
| Model | $x_k = F_{k-1}x_{k-1} + u_{k-1}$ |
| Ideal command | $u_k = B_k x_k$ |
| Observation | $y_k = H_k x_k + \eta_k$ |
| | $F_k = I_n$ |
| | $H_k = I_n$ |
| | $B_k = -\alpha L_{n,k}$ |

Figure 12:
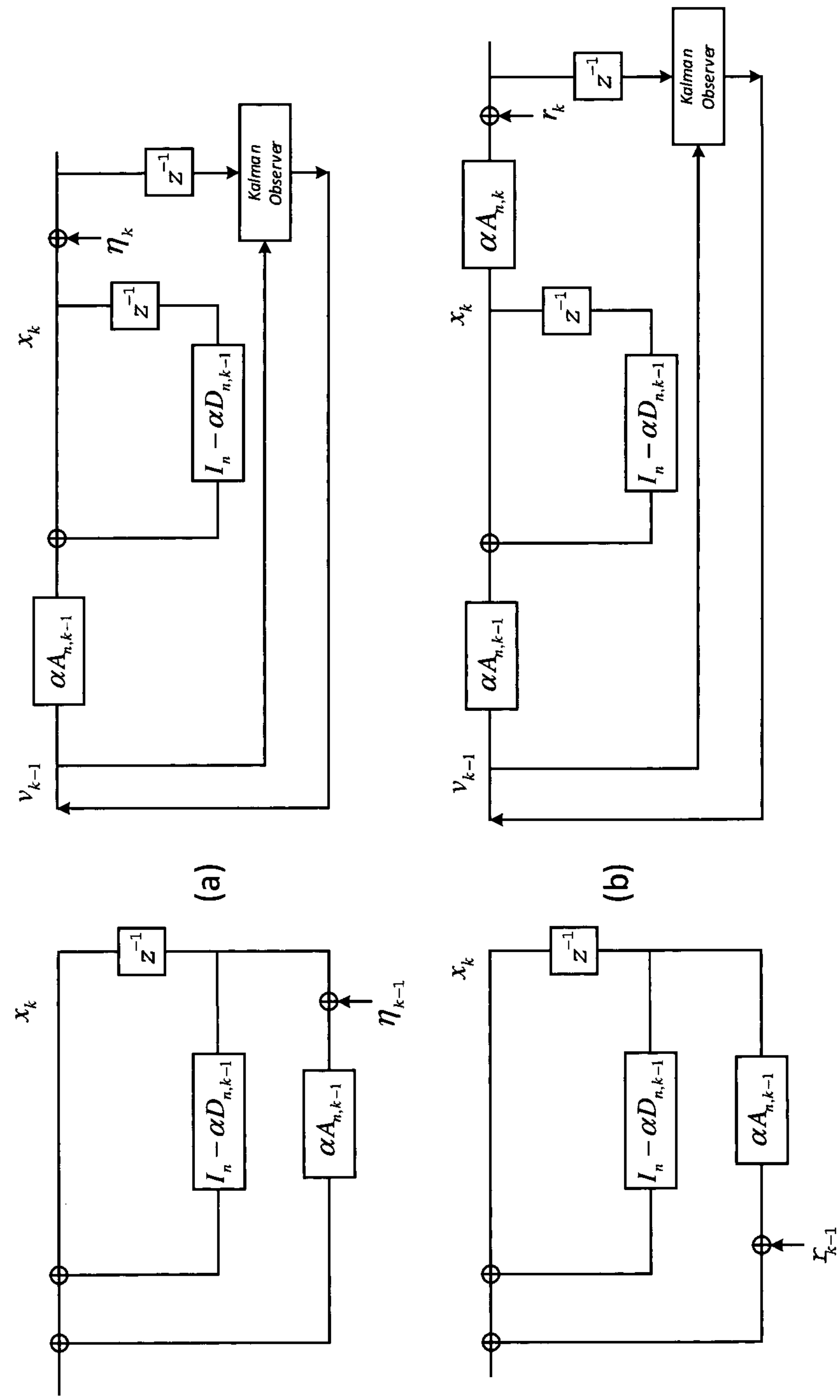
FIG. 12 are representations of Kalman filter-based state observers for a noisy consensus algorithm.

A Kalman filter-based state-observer can thus be applied using the model given in Table III (represented in part a) of FIG. 12).

TABLE III

| | |
|---|---|
| Model | $x_k = F_{k-1}x_{k-1} + B_{k-1}v_{k-1}$ |
| Observation | $y_k = H_k x_k + r_k$ |
| | $r_k = \eta_k$ |
| Command | $v_k = \overline{x}_k$ |
| | $F_k = I_n$ |
| | $H_k = I_n$ |
| | $B_k = -\alpha L_{n,k}$ |

b) Structure (b)—Transmission and Edge-Related Noise

In this structure, the consensus algorithm is modelled as a single integrator which output is observed through the adjacency matrix with an additive noise component. As shown in Table IV, the integrator shall be controlled by means of a feedback loop built as the difference between the local state value applied to the degree matrix and the neighbor's state values applied to the adjacency matrix.

TABLE IV

| | |
|---|---|
| Model | $x_k = F_{k-1}x_{k-1} + u_{k-1}$ |
| Ideal command | $u_k = B_k x_k$ |
| Observation | $y_k = H_k x_k + \xi_k$ |
| | $F_k = I_n$ |
| | $H_k = \alpha L_{n,k}$, $B_k = -\alpha L_{n,k}$ |

A Kalman filter-based state-observer can thus be applied using the model given in Table V (represented in part b) of FIG. 12).

TABLE V

| | |
|---|---|
| Model | $x_k = F_{k-1}x_{k-1} + u_{k-1}$ |
| Observation | $y_k = H_k x_k + r_k$ |
| | $r_k = \xi_k$ |
| Command | $u_k = B_k v_k - \alpha D_{n,k} x_k$ |
| | $v_k = \overline{x}_k$ |
| | $F_k = I_n$ |
| | $H_k = \alpha A_{n,k}$ |
| | $B_k = \alpha A_{n,k}$ |

It is important to note that the Kalman filter needs to reflect the correlation that exists in the observation noise ($r_k = A_{n,k}\eta_k$).

In both cases, the gain matrix G in the feedback loop is the identity matrix.

Due to noise, it is not possible to observe the true local values of the state parameter. From the set of equations above, we build an observer of the local values of the state parameter using a Kalman predictor or filter. The true state value is then replaced by its estimation $\overline{x}_k$ (or $\hat{x}_{k-1}$) to build the command signal $v_k = \overline{x}_k$ (or $v_k = \hat{x}_{k-1}$). Ultimately, the communicating devices "simply" implement the standard consensus algorithm where the noisy local values are replaced by their estimate in the command. The issue is here that the system is described by the global state space equations, i.e. by considering the global aggregated state parameter. When implementing the de-noising Kalman filter, the Kalman filter-based state observer does not allow to predict the local value of the state parameter of each communicating device solely from the local values received from its $n_i$ neighbors in the subset $\Theta_i$. Instead, the Kalman filter-based state observer described above requires the knowledge of the local values from all the n communicating devices.

H) Method for Controlling the State Parameter

As discussed above, the present disclosure relates to a method 40 for controlling a state parameter by a communicating device 20 among a set of communicating devices 20. It is emphasized that the controlling method 40 is implemented by each communicating device 20 of the considered set, or by each communicating device 20 except the leader if the cooperative control algorithm uses a leader-follower approach (one communicating device—i.e. the leader—does not update its local value to force the other ones to track its local value). In the sequel the controlling method 40 is assumed to be implemented by the i-th communicating device referred to as 20-*i* ($1 \leq i \leq n$, wherein n is the total number of communicating devices 20). Each communicating device 20 stores a respective local value of the state parameter, which are typically different, and the communicating devices 20 implement the controlling method 40 in order to have their respective local values of the state parameter converge towards a same value, referred to as "consensus value". For that purpose, the controlling method 40 uses a cooperative control algorithm such as e.g. the consensus algorithm discussed above.

The communicating device 20-*i* is adapted to receive data from a subset $\Theta_i$ of the other communicating devices 20-*j*, $j \neq i$. The subset $\Theta_i$ is assumed to comprise $n_i$ other communicating devices 20-*j*, with $n_i < n-1$. Hence, the communicating device 20-*i* receives recurrently the local values of the state parameter of the $n_i$ communicating devices 20-*j* in the subset $\Theta_i$, and uses the received local values to update its own local value according to e.g. the consensus algorithm. Once it has updated its own local value of the state parameter, it transmits its own updated local value of the state parameter to other communicating devices, for instance to the same communicating devices 20-*j* of the subset $\Theta_i$ from which it has received local values of the state parameter.

We denote by $$\Theta_i^+$$

the subset of communicating devices which corresponds to the union of the subset $\Theta_i$ with the communicating device 20-*i*. Hence, the subset $$\Theta_i^+$$

comprises $n_i+1<n$ communicating devices. As discussed above, the controlling method 40 is implemented by each communicating device 20, and n subsets $$\Theta_i^+,$$

$1 \le i \le n$, are defined, one for each communicating device 20. Of course, the n subsets $$\Theta_i^+$$

are not all identical, since each communicating device 20-*i* receives data from only some ($n_i$) of the other n−1 communicating devices 20.

In the sequel, the communicating device 20-*i* which implements the controlling method 40 is referred to as "processing device 20-*i*" in order to avoid confusion with the other communicating devices 20.

Focusing on the processing device 20-*i*, we assume in the sequel, in a non-limitative manner, that the associated subset $\Theta_i$ does not vary over time, i.e. from one iteration to another, and that the number $n_i$ does not vary over time. However, it also possible, in some cases, to have a number $n_i$ that varies due to e.g. a subset $\Theta_i$ that varies over time or e.g. packet losses that may cause the processing device 20-*i* to receive data from fewer than $n_i$ other communicating devices 20-*j*, $j \neq i$ in some iterations. In case of a packet loss, a solution consists in setting for this specific iteration the corresponding observation noise variance at a very high value in order not to account for the missing observation replaced by an appropriately selected value.

Figure 13:
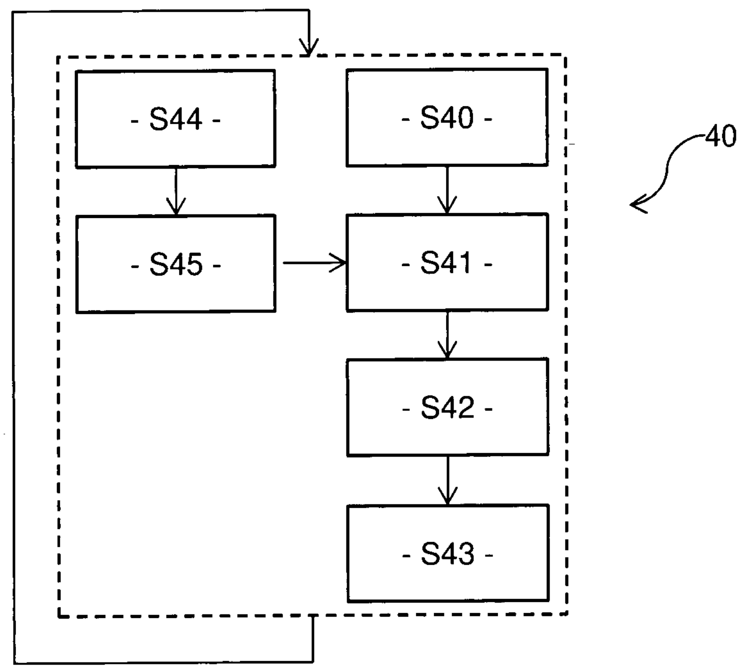
FIG. 13 is a diagram representing the main steps of an exemplary embodiment of a method for controlling a state parameter.

FIG. 13 represents schematically the main steps of the method 40 for controlling a state parameter by the processing device 20-*i*. As can be seen in FIG. 13, the controlling method 40 comprises several steps that are executed and iterated by the processing device 20-*i*.

As illustrated by FIG. 13, the controlling method 40 comprises conventional steps of a cooperative algorithm such as the consensus algorithm, executed by the processing device 20-*i*, which comprise:

- a step S40 of receiving local values from the other communicating devices 20 of the subset $$\Theta_i^+$$

associated to the processing device 20-*i*;
- a step S42 of updating its local value of the state parameter based on the received local values of the state parameter, wherein at least some of the received local values are corrupted by an observation noise;
- a step S43 of transmitting its local value of the state parameter to other communicating devices 20.

At this stage, it is emphasized that the order of the steps within each iteration, as illustrated in FIG. 13, is given for illustration purposes only, and said steps may also be executed in a different order. For instance, the step S40 of receiving local values from the other communicating devices 20 in the subset of $$\Theta_i^+$$

(i.e. from the communicating devices 20 of the subset $\Theta_i$) is executed when said other communicating devices 20 execute the transmitting step S43, after they have executed the updating step S42. Also, the receiving step S40 and the transmitting step S43 can also be executed immediately before executing the updating step S42, in which case the local values received/transmitted correspond to the local values updated during the previous iteration, etc.

During step S42, the processing device 20 updates its own local value of the state parameter according to a consensus algorithm, based on the updated local values received from the communicating devices 20 of the subset $\Theta_i$.

However, since all or part of the received local values are observed with an observation noise, the processing device 20 does not use directly the received local values and implements a Kalman filter-based state observer in order to de-noise the observed local values of the state parameter. Hence, as illustrated by FIG. 13, the controlling method 40 comprises a step S41 of estimating the local values of the subset $$\Theta_i^+$$

based on the observations of said local values, by using a Kalman filter-based state observer. More specifically, the Kalman filter-based state observer is used to estimate an aggregated state parameter which aggregates the local values of the communicating devices 20 of the subset $$\Theta_i^+$$

(i.e. including the own local value of the state parameter of the processing device 20-*i*). Then, during the updating step S42, instead of using directly the received (noisy) local values of the state parameter, the processing device 20-*i* updates its own local value of the state parameter based on the estimated aggregated state parameter. As discussed above, due to the fact that the observations of the communicating devices 20 in the subset $\Theta_i$ are not available immediately, but typically with a delay of one iteration, the estimated aggregated state parameter may correspond to e.g. an a priori estimation (i.e. prediction) of the aggregated state parameter (for e.g. the current iteration) or to e.g. an a posteriori estimation of the aggregated state parameter (for e.g. the previous iteration), etc.

The Kalman filter-based state observer applies a process model which assumes that each communicating device 20 of the subset $$\Theta_i^+$$

receives data only from communicating devices 20 of said subset $$\Theta_i^+.$$

Of course, this assumption holds for the processing device 20-*i* but it does not hold for all the communicating devices 20 in the subset $\Theta_i$. Indeed, each communicating device 20-*j* (j≠i) in the subset $\Theta_i$ updates its own local value of the state parameter based on the local values received from the communicating devices in its own subset $\Theta_j$, which is typically different from the subset $\Theta_i$. Hence, the process model assumed by the Kalman filter-based state observer is erroneous at least in that it disregards the fact that the communicating devices in the subset $\Theta_i$ update their own local value of the state parameter based on local values that are received from communicating devices 20 which are not in the subset $$\Theta_i^+.$$

The error introduced by this assumption is modeled in the process model as a process noise.

In a non-limitative manner, we assume here that the system is affected by a transmission edge-related noise. Using the notations introduced above, we may assume that the processing device 20-*i* aims at updating its own local value of the state parameter using the consensus algorithm:

$$x_{i,k} = x_{i,k-1} + u_{i,k-1}$$

where:

$$u_{i,k} = -\alpha n_i x_{i,k-1} + \alpha 1_{n_i}^t \breve{x}_k^{(i)}$$

$$\breve{x}_k^{(i)} = \left[[x_{j,k}]_{j\in\Theta_i(k)}^t\right]^t$$

The issue is that the received local values of the state parameter are corrupted by an observation noise:

$$\breve{y}_k^{(i)} = \breve{x}_k^{(i)} + \breve{\eta}_k^{(i)}$$

In the sequel, we use the typical Kalman notation $$\breve{r}_k^{(i)} = \breve{\eta}_k^{(i)}.$$

Note that we focus here on the processing device 20-*i* alone. The local values of the state parameter issued by the neighbors are thus directly observed with noise and not through an observation matrix as described above.

The Kalman filter-based state observers presented previously may be applied by the processing device 20-*i* by assuming (erroneously) that there are no other communicating devices 20 but those $n_i$+1 communicating devices 20 in the subset $$\Theta_i^+.$$

Hence, the Kalman filter used is restricted to the communicating devices 20 in the subset $$\Theta_i^+.$$

This Kalman filter, and the process model assumed is therefore local to the processing device 20-*i*. Accordingly, uik may be modified as follows:

$$u_{i,k} = -\alpha n_i x_{i,k-1} + \alpha\left[0, 1_{n_i}^t\right] x_k^{(i)}$$

wherein $$x_k^{(i)}$$

is the aggregated state parameter for the subset $$\Theta_i^+:$$

$$x_k^{(i)} = \left[x_{i,k}, \breve{x}_k^{(i)}\right]^t$$

In order to build the process model, the update equation of the consensus algorithm is extended to the aggregated state parameter $$x_k^{(i)}:$$

$$\begin{cases} x_k^{(i)} = x_{k-1}^{(i)} + u_{k-1}^{(i)} \\ u_{k-1}^{(i)} = -\alpha n_i x_{k-1}^{(i)} + \alpha\left(J_{n_i+1} - I_{n_i+1}\right) v_{k-1}^{(i)} \end{cases}$$

Ideally, the system shall be closed using $$v_{k-1}^{(i)} = x_{k-1}^{(i)}.$$

In the present case, it is assumed that the aggregated state parameter $$x_k^{(i)}$$

is observed with an observation noise:

$$y_k^{(i)} = x_k^{(i)} + r_k^{(i)}$$

In this expression, the state parameter local value of the processing device 20-*i* is also assumed in a non-limitative manner to be observed with an observation noise representing the observation noise that affects its local value when observed by the other communicating devices 20 in the subset $$\Theta_i^+.$$

It is therefore possible to implement a Kalman filter-based state observer in order to feedback the noisy observations but a de-noised estimation of the state parameter $$v_{k-1}^{(i)} = \overline{x}_{k-1}^{(i)}.$$

As discussed above, this equation assumes that there are no other communicating devices 20 but those $n_i+1$ communicating devices 20 in the subset $$\Theta_i^+.$$

This equation is accurate only for the local value $x_{i,k}$ of the state parameter of the processing device 20-*i* as the other local values are actually updated by the communicating devices 20 in the subset $\Theta_i$. Hence, the error introduced is modeled as a process noise:

$$x_k^{(i)} = (1-\alpha n_i)x_{k-1}^{(i)} + \alpha(J_{n_i+1} - I_{n_i+1})v_{k-1}^{(i)} + q_{k-1}^{(i)}$$

wherein $$q_k^{(i)}$$

is the process noise representing the error performed in the update equation of the consensus algorithm. It is therefore possible to implement a Kalman filter-based state observer using the process model introduced above, e.g. as follows:

$$\begin{cases} x_k^{(i)} = F_{k-1}^{(i)} x_{k-1}^{(i)} + u_{k-1}^{(i)} + q_{k-1}^{(i)} \\ u_k^{(i)} = -\alpha n_i x_k^{(i)} + B_k^{(i)} v_k^{(i)} \\ y_k^{(i)} = H_k^{(i)} x_k^{(i)} + r_k^{(i)} \end{cases}$$

with:

$$\begin{cases} F_k^{(i)} = I_{n_i+1} \\ B_k^{(i)} = \alpha(J_{n_i+1} - I_{n_i+1}) \\ H_k^{(i)} = I_{n_i+1} \end{cases}$$

For instance, the process noise $$q_k^{(i)}$$

and the observation noise $$r_k^{(i)}$$

may be assumed to be unbiased and Gaussian random variables with respective covariance matrices $$Q_k^{(i)} = \mathbb{E}\left[q_k^{(i)} q_k^{(i)t}\right]$$

and $$R_k^{(i)} = \mathbb{E}\left[r_k^{(i)} r_k^{(i)t}\right].$$

As illustrated by FIG. 13, the controlling method 40 comprises also a step S44 of determining, by the processing device 20-*i*, a convergence level of the local values of the state parameter. The convergence level represents whether or not the local values of the communicating devices 20 of the subset $$\Theta_i^+$$

are approaching a consensus value. Non-limitative examples for computing the convergence level are provided hereinbelow.

As illustrated by FIG. 13, the controlling method 40 comprises also a step S45 in which the processing device 20 controls the covariance matrix $$Q_k^{(i)}$$

in the Kalman filter based on the estimated convergence level. Indeed, while the process model is not accurate in that it disregards the communicating devices 20 which are not in the subset $$\Theta_i^+,$$

it can be assumed that the error made will be higher when the communicating devices 20 in the subset $$\Theta_i^+$$

are far from reaching a consensus than when they have almost reached a consensus. In other words, if the convergence level indicates that the local values of the state parameter (of the subset $$\Theta_i^+)$$

are far from having converged, the covariance matrix $$Q_k^{(i)}$$

should have a higher norm than when the convergence level indicates that said local values have almost converged. By controlling the covariance matrix $$Q_k^{(i)},$$

it is possible to increase progressively the influence of the process model in the estimation of the aggregated state parameter as the local values of the state parameter progressively converge towards a consensus value.

For instance, in some embodiments, modifying the covariance matrix $$Q_k^{(i)}$$

of the process noise comprises causing a norm of said covariance matrix to progressively decrease as the local values of the state parameter progressively converge. For instance, the individual coefficients of said covariance matrix $$Q_k^{(i)}$$

can be modified in such a way that the norm of said covariance matrix $$Q_k^{(i)},$$

for instance the Frobenius norm, decreases as the local values of the state parameter converge.

Alternatively, or in combination, the covariance matrix $$Q_k^{(i)}$$

of the process noise may be modified in relation with the covariance matrix $$R_k^{(i)}$$

of the observation noise. For instance, the covariance matrix $$Q_k^{(i)}$$

of the process noise is modified to cause a ratio between the norm of the covariance matrix $$Q_k^{(i)}$$

of the process noise and the norm of the covariance matrix $$R_k^{(i)}$$

of the observation noise to progressively decrease as the local values of the state parameter progressively converge. Preferably, said ratio should be below one (<1) when said local values have almost converged, in which case the Kalman filter will favor the process model over the observations for estimating the aggregated state parameter.

For instance, the covariance matrix $$Q_k^{(i)}$$

of the process noise may be modified as follows:

$$Q_k^{(i)} = f\left(D_k^{(i)}\right) \times R_k^{(i)}$$

wherein $$D_k^{(i)}$$

corresponds to the estimated convergence level and $f$ corresponds to a predetermined function.

$$f\left(D_k^{(i)}\right)$$

corresponds to a weighting factor and is for instance a positive scalar value, in which case the covariance matrix $$Q_k^{(i)}$$

is proportional to the covariance matrix $$R_k^{(i)}.$$

If we assume that the convergence level $$D_k^{(i)}$$

decreases when approaching consensus, then the function $f$ is such that $$f(D_k^{(i)}) < f(D_{k'}^{(i)}) \text{ if } D_k^{(i)} < D_{k'}^{(i)}.$$

The ratio between the Frobenius norms of the covariance matrices $$Q_k^{(i)}$$

and $$R_k^{(i)}$$

is equal to $$f(D_k^{(i)})$$

in this case.

However, the covariance matrix $$Q_k^{(i)}$$

of the process noise may also be similarly modified without using the covariance matrix $$R_k^{(i)}$$

of the observation noise, for instance as follows:

$$Q_k^{(i)} = f(D_k^{(i)}) \times Q_0^{(i)}$$

In some embodiments, assuming that the convergence level $$D_k^{(i)}$$

decreases when approaching consensus, then the function $f$ may be defined as:

$$f(D_k^{(i)}) = K_1 \times (D_k^{(i)})^{K_2}$$

wherein $K_1$ is a predefined positive scalar value and $K_2>0$ is a predefined scalar positive value. For instance, $K_1=1$ and $K_2=2$. However, other definitions of the function $f$ may be used in other embodiments, provided that the function $f$ decreases as the local values of the state parameter converge.

In some embodiments, the convergence level $$D_k^{(i)}$$

may be determined based on a number of iterations of the updating step performed from an initial local value of the state parameter. In such cases, the consensus algorithm is assumed to converge as the number of iterations increases. Determining the convergence level $$D_k^{(i)}$$

comprises obtaining the number k of iterations and said convergence level is for instance given by $$D_k^{(i)} = 1/k$$

which yields $$f(D_k^{(i)}) = K_1/k^{K_2}$$

in the previous example of the function $f$.

Alternatively, the convergence level $$D_k^{(i)}$$

may be estimated based of the local values of the state parameter of the communicating devices 20 in the subset $$\Theta_i^+.$$

For instance, it is possible to estimate the consensus value, and to compute a distance between the local values of the state parameter and the estimated consensus value.

In some cases, the consensus value may be estimated based on the aggregated state parameter observation $$y_k^{(i)}$$

(of based on $$\overline{y}_k^{(i)}).$$

For instance, the estimate $\mu_{i,k}$ of the consensus value may be estimated as the average local value computed based on the local values in $$y_k^{(i)}$$

(or in $$\breve{y}_k^{(i)}$$

) and the distance may be computed as the variance of the local values in $$y_k^{(i)}$$

(or in $$\breve{y}_k^{(i)}).$$

Considering the observed local values $$\breve{y}_k^{(i)}$$

of the communicating devices 20 in the subset $\Theta_i$, then we may have:

$$\mu_{i,k} = \frac{1}{n_i} \sum_{j \in \Theta_i(k)} y_{j,k}$$

$$D_k^{(i)} = \frac{1}{n_i} \sum_{j \in \Theta_i(k)} (y_{j,k} - \mu_{i,k})^2$$

In preferred embodiments, the convergence level $$D_k^{(i)}$$

may be determined by computing a distance between two multivariate Gaussian random variables, which may be defined as:

$$\breve{p}_k^{(i)} = \mathcal{N}\left(\breve{\mu}_k^{(i)}, \breve{\sum}_k^{(i)}\right)$$

$$\breve{p}_k^{ref(i)} = \mathcal{N}\left(\breve{\mu}_k^{ref(i)}, \breve{\sum}_k^{ref(i)}\right)$$

wherein:

$$\breve{\mu}_k^{(i)} = \mathbb{E}\left[\breve{y}_k^{(i)}\right]$$

is a mean computed based on the local values $$\breve{y}_k^{(i)}$$

in the aggregated state parameter observed over successive iterations;

$$\breve{\Sigma}_k^{(i)} = \mathbb{E}\left[\left(\breve{y}_k^{(i)} - \breve{\mu}_k^{(i)}\right)\left(\breve{y}_k^{(i)} - \breve{\mu}_k^{(i)}\right)^t\right]$$

is a covariance matrix-computed based on the local values $$\breve{y}_k^{(i)}$$

in the aggregated state parameter observed over successive iterations;

$$\breve{\mu}_k^{ref(i)} = x_{i,k} 1_{n_i}$$

wherein $x_{i,k}$ is used as an estimate $\mu_{i,k}$ of the consensus value;

$$\breve{\Sigma}_k^{ref(i)} = \mathbb{E}\left[\left(\breve{r}_k^{(i)}\right)\left(\breve{r}_k^{(i)}\right)^t\right]$$

is the covariance matrix of the observation noise, considering only the communicating devices 20 in the subset $\Theta_i$.

Hence, we measure the distance between the current observations assumed to be Gaussian with known mean and covariance matrix and the current consensus value assumed to be measured in the observation noise. The mean and covariance matrices are estimated by any appropriate means such as an infinite impulse response (IIR) filter. The distance between the two Gaussian random variables can then be estimated by using the Bhattacharyya distance:

$$D_k^{(i)} = \frac{1}{8}\left(\breve{\mu}_k^{(i)} - \breve{\mu}_k^{ref(i)}\right)^t {\sum_k^{(i)}}^{-1} \left(\breve{\mu}_k^{(i)} - \breve{\mu}_k^{ref(i)}\right) + \frac{1}{2}\log\left(\frac{\det\left(\sum_k^{(i)}\right)}{\sqrt{\det\left(\breve{\sum}_k^{(i)}\right)\det\left(\breve{\sum}_k^{ref(i)}\right)}}\right)$$

wherein $$\Sigma_k^{(i)} = \left(\breve{\Sigma}_k^{(i)} + \breve{\Sigma}_k^{ref(i)}\right) \Big/ 2.$$

Alternate expressions for computing the distance between the multivariate Gaussian random variables may be used, for instance:

$$D_k^{(i)} = \frac{1}{8}\left(\breve{\mu}_k^{(i)} - \breve{\mu}_k^{ref(i)}\right)^t {\sum_k^{(i)}}^{-1} \left(\breve{\mu}_k^{(i)} - \breve{\mu}_k^{ref(i)}\right)$$

Then the covariance matrix $$Q_k^{(i)}$$

may be controlled as discussed above, for instance as $$Q_k^{(i)} = f\left(D_k^{(i)}\right) \times R_k^{(i)} \text{ or as } Q_k^{(i)} = \left(D_k^{(i)}\right) \times Q_0^{(i)}.$$

I) Detailed Example

We provide below a non-limitative example of detailed implementation of the controlling method 40, assuming in a non-limitative manner that the convergence level is determined by using the Bhattacharyya distance and that $$Q_k^{(i)} = f\left(D_{k-1}^{(i)}\right) \times R_k^{(i)} \text{ with } f\left(D_k^{(i)}\right) = \left(D_k^{(i)}\right)^2.$$

We use the same notations as introduced above:

$$x_k^{(i)} = \left[x_{i,k}, \, \overline{x}_k^{(i)}\right]^t \text{ with } \overline{x}_k^{(i)} = \left[[x_{j,k}]_{j \in \Theta_i(k)}^t\right]^t;$$

$$r_k^{(i)} = \left[r_{i,k}, \, \overline{r}_k^{(i)}\right]^t \text{ with } \overline{r}_k^{(i)} = \left[[r_{j,k}]_{j \in \Theta_i(k)}^t\right]^t;$$

$$y_k^{(i)} = \left[y_{i,k}, \, \overline{y}_k^{(i)}\right]^t \text{ with } \overline{y}_k^{(i)} = \left[[y_{j,k}]_{j \in \Theta_i(k)}^t\right]^t;$$

$\Theta_i(k)$ is the subset of communicating devices 20 from which the processing device 20-*i* receives data at the iteration k.

a) Initialization (Iteration k=0)

The initialization may be performed as follows:

$x_{i,0}=x_i$ which is transmitted to the other communicating devices 20 during step S43;

$$\overline{x}_0^{(i)} = 0;$$

$$\overline{\mu}_{-1}^{(i)} = 0;$$

$$\overline{\sum}_{-1}^{(i)} = 0;$$

$$P_{0|-1}^{(i)} = 10\sigma_x^2 I_{n_i+1}, \text{ where } \sigma_x^2$$

is the variance of the communicating devices' initial local values of the state parameter;

$\beta<1$;

it is assumed that the covariance matrix of the observation noise is known either using "typical" values or from any appropriate measurements means;

$\alpha$ is the control parameter of the consensus algorithm, set to a value ensuring the convergence of the noiseless consensus algorithm with respect to the Laplacian matrix of the system, e.g. $\alpha=1/(2\deg_{max})$.

b) Iteration k≥1

The observation for the previous iteration may be built based on the local values received from the other communicating devices 20 during step S40:

$$y_{k-1}^{(i)} = x_{k-1}^{(i)} + r_{k-1}^{(i)}$$

Then the Kalman filter-based state observer may be updated during step S41 as follows:

$$S_{k-1}^{(i)} = H_{k-1}^{(i)} P_{k-1|k-2}^{(i)} H_{k-1}^{(i)t} + R_{k-1}^{(i)}$$

$$K_{k-1}^{(i)} = P_{k-1|k-2}^{(i)} H_{k-1}^{(i)t} S_{k-1}^{(i)-1}$$

$$P_{k-1|k-1}^{(i)} = \left(I - K_{k-1}^{(i)} H_{k-1}^{(i)}\right) P_{k-1|k-2}^{(i)}$$

$$\overline{y}_{k-1}^{(i)} = H_{k-1}^{(i)} \overline{x}_{k-1}^{(i)}$$

$$\hat{x}_{k-1}^{(i)} = \overline{x}_{k-1}^{(i)} + K_{k-1}^{(i)} \left(y_{k-1}^{(i)} - \overline{y}_{k-1}^{(i)}\right)$$

$$\overline{x}_k^{(i)} = F_{k-1}^{(i)} \hat{x}_{k-1}^{(i)} + B_{k-1}^{(i)} \overline{x}_{k-1}^{(i)}$$

$$P_{k|k-1}^{(i)} = F_{k-1}^{(i)} P_{k-1|k-1}^{(i)} F_{k-1}^{(i)t} + Q_{k-1}^{(i)}$$

$$\overline{x}_k^{(i)}$$

corresponds to the a priori estimation of the aggregated state parameter $$x_k^{(i)}$$

for the current iteration k and $$\hat{x}_{k-1}^{(i)}$$

corresponds to the a posteriori estimation of the aggregated state parameter $$x_{k-1}^{(i)}$$

for the previous iteration k−1, which uses the observation $$y_{k-1}^{(i)}$$

which is available at the iteration k.

The updating step S42 of the consensus algorithm may be performed as follows:

$$x_{i,k} = (1 - \alpha n_i) x_{i,k-1} + \alpha\left[0, \, 1_{n_i}^t\right] v_{k-1}^{(i)} \text{ with } v_{k-1}^{(i)} = \overline{x}_k^{(i)} \text{ or } v_{k-1}^{(i)} = \hat{x}_{k-1}^{(i)}.$$

The convergence level $$D_{k-1}^{(i)}$$

is estimated during step S44 as follows:

$$\breve{\mu}_{k-1}^{(i)} = (1-\beta)\breve{\mu}_{k-2}^{(i)} + \beta\breve{y}_{k-1}^{(i)}$$

$$\breve{\sum}_{k-1}^{(i)} = (1-\beta)\breve{\sum}_{k-2}^{(i)} + \beta\breve{y}_{k-1}^{(i)}\breve{y}_{k-1}^{(i)t}$$

$$\breve{\mu}_{k-1}^{ref(i)} = x_{i,k-1}1_{n_i}$$

$$\breve{\sum}_{k-1}^{ref(i)} = R_{k-1}^{(i)}(1:n_i 1:n_i)$$

$$\sum_k^{(i)} = \frac{\breve{\sum}_{k-1}^{(i)} + \breve{\sum}_{k-1}^{ref(i)}}{2}$$

$$D_{k-1}^{(i)} = \frac{1}{8}\left(\breve{\mu}_{k-1}^{(i)} - \breve{\mu}_{k-1}^{ref(i)}\right)^t \sum_k^{(i)^{-1}} \left(\breve{\mu}_{k-1}^{(i)} - \breve{\mu}_{k-1}^{ref(i)}\right) + \frac{1}{2}\log\left(\frac{\det\left(\sum_k^{(i)}\right)}{\sqrt{\det\left(\breve{\sum}_{k-1}^{(i)}\right)\det\left(\breve{\sum}_{k-1}^{ref(i)}\right)}}\right)$$

And the covariance matrix $$Q_k^{(i)}$$

of the process noise can be updated during step S45 as follows $$Q_k^{(i)} = \left(D_{k-1}^{(i)}\right) \times R_k^{(i)}$$

The updated local value $x_{i,k}$ is transmitted to the other communicating devices 20 during step S43.

J) Communicating Device

Figure 14:
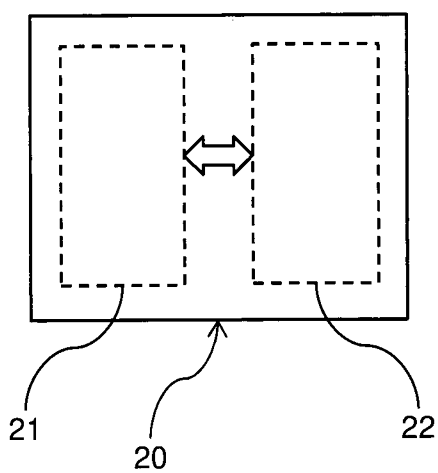
FIG. 14 is a schematic representation of an exemplary embodiment of a communication device.

FIG. 14 represents schematically an exemplary embodiment of a communicating device 20 suitable for implementing the controlling method 40.

In this exemplary embodiment, the communicating device 20 comprises a processing circuit 21 and a communication unit 22, coupled to the processing circuit 21. For instance, the processing circuit 21 comprises one or more processors and storage means (magnetic hard disk, solid-state disk, optical disk, electronic memory, etc.) in which a computer program product is stored in order to be executed by the one or more processors. Alternatively, or in combination thereof, the processing circuit 21 can comprise one or more programmable logic circuits (FPGA, PLD, etc.), and/or one or more specialized integrated circuits (ASIC), and/or a set of discrete electronic components, etc. The communication unit 22 comprises for instance a transceiver circuit comprising components (antenna(s), amplifier(s), local oscillator(s), mixer(s), analog and/or digital filter(s), etc.) considered known to the skilled person. The communication unit 22 is compatible with one or more wired and/or wireless communication protocols. In general, any communication protocol may be used. In case of a platooning application (i.e. with the communicating devices 20 embedded in respective vehicles of a platoon), the one or more communication protocols may include one or more V2V communication protocols such as those defined by the ITS-G5, IEEE WAVE or 3GPP Cellular-V2X standards, etc.

K) OTHER EMBODIMENTS

It is emphasized that the present disclosure is not limited to the above exemplary embodiments. Variants of the above exemplary embodiments are also within the scope of the present disclosure.

For instance, it has been assumed so far that the number of communicating devices 20 in the subset $\Theta_i$ is fixed equal to $n_i$, which means that the propagation channel is perfect. In practice, the propagation channel impairments can lead to losses of packets. The controlling method 40 can be extended to switching topologies replacing the deterministic versions of the matrices $$H_k^{(i)}, F_k^{(i)} \text{ and } B_k^{(i)}$$

by their switching equivalent setting to 0 the entries corresponding to communication links that suffered a packet loss. Hence, the processing device 20-*i* can dynamically adapt the process model at each iteration to account for packets of data, containing updated local values, that were not received from the communicating devices 20 of the subset $\Theta_i(k)$. Similarly, the subset $\Theta_i(k)$ may vary from one iteration to the other and the process model may be updated accordingly by the processing device 20-*i*. Another solution consists in setting, for a specific iteration during which packets have been lost, the corresponding observation noise variance at a very high value in order not to account for the missing observation replaced by an arbitrary value.

Also, it is possible in some cases to include in the process noise other sources of errors, for instance an intrinsic process noise. The global covariance matrix of the process noise may be set as the sum of a covariance matrix of the intrinsic process noise and the covariance matrix $$Q_k^{(i)}$$

of the process noise controlled based on the convergence level. Also, a small diagonal component may be included in some cases in the covariance matrix $$Q_k^{(i)}$$

to cope with cases where e.g. the estimated convergence level would be representative of an almost reached consensus too quickly with respect to the actual convergence of the consensus algorithm.

The invention claimed is:

1. A method for controlling a state parameter by a communicating device, referred to as processing device, in a set of communicating devices, said processing device storing a first local value of the state parameter and exchanging data with other communicating devices to enable all communicating devices to converge towards having a same value of the state parameter, referred to as consensus value, wherein a subset of communicating devices is associated to said processing device, said subset including the processing device and the communicating devices from which said processing device receives data, said method comprising iterating steps of:

receiving second local values of the state parameter from the other communicating devices of the subset associated to the processing device;

updating the first local value of the state parameter based on the received second local values of the state parameter, wherein at least some of said received local values are corrupted by an observation noise;

transmitting the first local value of the state parameter to other communicating devices;

wherein the processing device iteratively estimates an aggregated state parameter aggregating third local values of the state parameter of the communicating devices of the subset, based on the received second local values of the state parameter, by using a Kalman filter which applies a process model, wherein the Kalman filter uses a covariance matrix of a process noise modeling an error introduced by the process model, said processing device updating the first local value of the state parameter based on the estimated aggregated state parameter;

wherein the processing device iteratively determines a convergence level of the third local values of the state parameter and controls the covariance matrix of the process noise based on the determined convergence level.

2. The method according to claim 1, wherein controlling the covariance matrix of the process noise comprises causing a norm of said covariance matrix of the process noise to decrease as the third local values of the state parameter converge.

3. The method according to claim 1, wherein the covariance matrix of the process noise is further modified based on a covariance matrix of the observation noise, and wherein modifying the covariance matrix of the process noise comprises causing a ratio between a norm of the covariance matrix of the process noise and a norm of the covariance matrix of the observation noise to decrease as the third local values of the state parameter converge.

4. The method according to claim 3, wherein the covariance matrix of the process noise corresponds to the covariance matrix of the observation noise multiplied by a positive weighting factor, and modifying the covariance matrix of the process noise comprises causing the weighting factor to decrease as the third local values of the state parameter converge.

5. The method according to claim 1, wherein determining the convergence level comprises estimating the consensus value and computing a distance between the third local values of the state parameter and the estimated consensus value.

6. The method according to claim 1, wherein determining the convergence level by the processing device at an iteration k comprises computing a distance between two multivariate Gaussian random variables.

7. The method according to claim 6, wherein the two multivariate Gaussian variables comprise:

a random variable having a mean and a covariance matrix computed based on the third local values of the state parameter observed over successive iterations; and a random variable representative of an estimate of the consensus value corrupted by the observation noise.

8. The method according to claim 6, wherein the distance computed is a Bhattacharyya distance.

9. The method according to claim 1, wherein the convergence level is determined based on a number of iterations of the updating step.

10. The method according to claim 1, wherein the processing device dynamically adapts the process model at each iteration to account for packets of data, containing updated local values, that were not received from other communicating devices of the subset.

11. The method according to claim 1, wherein the process model of the Kalman filter assumes that each communicating device of the subset associated to the processing device receives data only from communicating devices of said subset.

12. A non-transitory computer-readable storage medium comprising instructions which, when executed by a communication device comprising a communication unit and a processing circuit, configure the communication device to carry out the method according to claim 1.

13. A communication device comprising a communication unit and a processing circuit configured to carry out a method according to claim 1.

14. A communication system comprising a plurality of communicating devices according to claim 13.

* * * * *